US008065568B2

(12) United States Patent
Watanabe et al.

(10) Patent No.: US 8,065,568 B2
(45) Date of Patent: Nov. 22, 2011

(54) COMMUNICATION NETWORK FAILURE DETECTION SYSTEM, AND COMMUNICATION NETWORK FAILURE DETECTION METHOD AND FAILURE DETECTION PROGRAM

(75) Inventors: Yoshinori Watanabe, Tokyo (JP); Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 796 days.

(21) Appl. No.: 11/994,954

(22) PCT Filed: Jul. 11, 2006

(86) PCT No.: PCT/JP2006/314130
§ 371 (c)(1),
(2), (4) Date: Jan. 7, 2008

(87) PCT Pub. No.: WO2007/007895
PCT Pub. Date: Jan. 18, 2007

(65) Prior Publication Data
US 2009/0167520 A1 Jul. 2, 2009

(30) Foreign Application Priority Data

Jul. 11, 2005 (JP) ................................. 2005-202134

(51) Int. Cl.
*G06F 11/00* (2006.01)
(52) U.S. Cl. .......... 714/47.1; 714/26; 709/224; 702/187
(58) Field of Classification Search .................... 714/26, 714/47, 47.1; 702/180, 187; 709/223, 224
See application file for complete search history.

(56) References Cited

U.S. PATENT DOCUMENTS

| 5,513,343 | A | * | 4/1996 | Sakano et al. ................... 714/26 |
| 5,661,668 | A | * | 8/1997 | Yemini et al. ................. 702/186 |
| 5,761,502 | A | * | 6/1998 | Jacobs ................................. 1/1 |
| 7,076,695 | B2 | * | 7/2006 | McGee et al. .................. 714/47 |
| 7,257,744 | B2 | * | 8/2007 | Sabet et al. ..................... 714/56 |
| 7,277,821 | B2 | * | 10/2007 | Ochi et al. .................... 702/182 |
| 7,519,860 | B2 | * | 4/2009 | Hatonen et al. ................. 714/26 |
| 7,698,417 | B2 | * | 4/2010 | Rizzi et al. .................... 709/224 |
| 2003/0110398 | A1 | * | 6/2003 | Dacier et al. .................. 713/201 |
| 2005/0193281 | A1 | * | 9/2005 | Ide et al. ......................... 714/47 |
| 2006/0036729 | A1 | * | 2/2006 | Sakaguchi et al. ............ 709/224 |

(Continued)

FOREIGN PATENT DOCUMENTS
JP   5-35484 A   2/1993
(Continued)

OTHER PUBLICATIONS

Noboru Murata, Introduction: Independent Component Analysis, Tokyo Electric University Publishing, 2004.

(Continued)

*Primary Examiner* — Yolanda L Wilson
(74) *Attorney, Agent, or Firm* — Sughrue Mion, PLLC

(57) ABSTRACT

The system for detecting a failure on a communication network according to an objective basis by analyzing an alarm log output by a management server of the communication network and evaluating a degree of abnormality of the communication network tracing back to a more significant factor causing the alarm, calculates an occurrence intensity of the more significant factor 500 causing an alarm based on the recording contents of the alarm, and detects a failure derived from the more significant factor of the communication network based on the calculated intensity of occurrence of said more significant factor 500.

30 Claims, 20 Drawing Sheets

U.S. PATENT DOCUMENTS

| | | | |
|---|---|---|---|
| 2007/0074076 A1* | 3/2007 | Imai et al. ................. | 714/26 |
| 2007/0101202 A1* | 5/2007 | Garbow .................... | 714/47 |
| 2007/0288795 A1* | 12/2007 | Leung et al. .............. | 714/26 |

FOREIGN PATENT DOCUMENTS

| | | | |
|---|---|---|---|
| JP | 8-288944 A | 11/1996 |
| JP | 3082548 B2 | 6/2000 |
| JP | 2003-32253 A | 1/2003 |
| JP | 2004-289824 A | 10/2004 |
| JP | 2004-318552 A | 11/2004 |

OTHER PUBLICATIONS

Osamu Akashi et al., "Multi Agent o Mochiita Jiritsu Soshikikan Shindan System: Encore", Translation of Information Processing Society of Japan, vol. 40 No. 6, Information Processing Society of Japan, pp. 2659 to 2668, Jun. 15, 1999, p. 2659, left column, line 1 to right column, line 5.

* cited by examiner

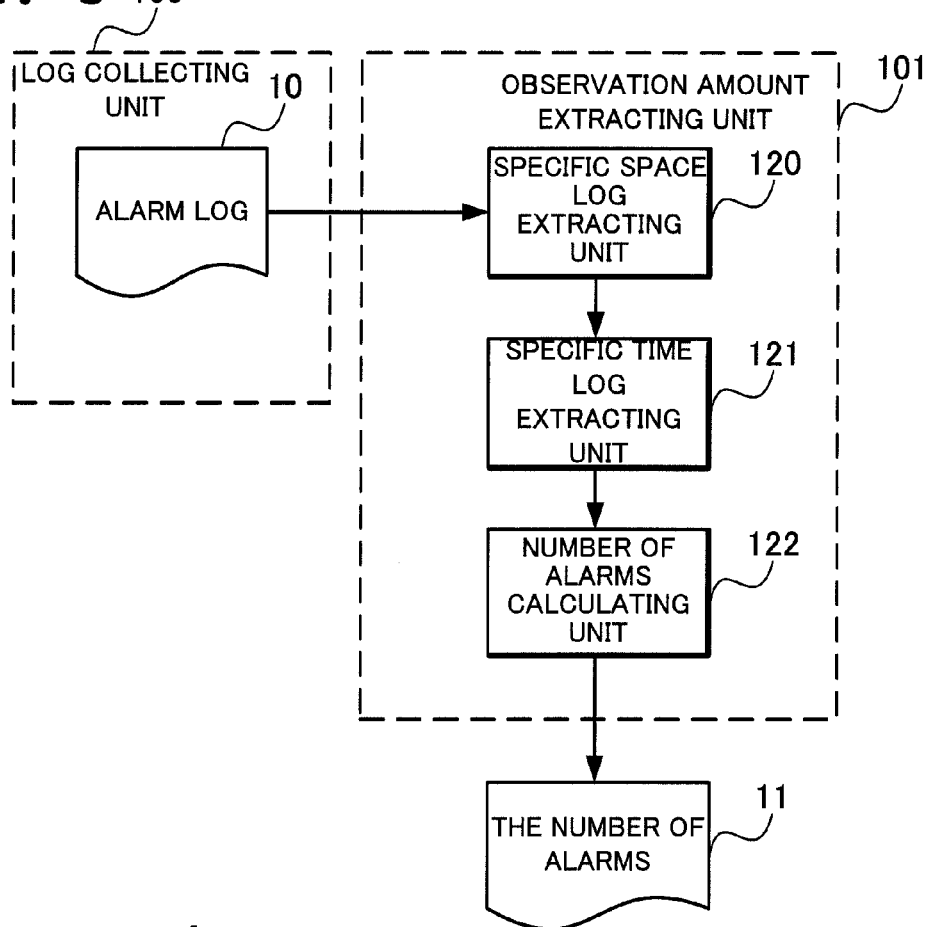
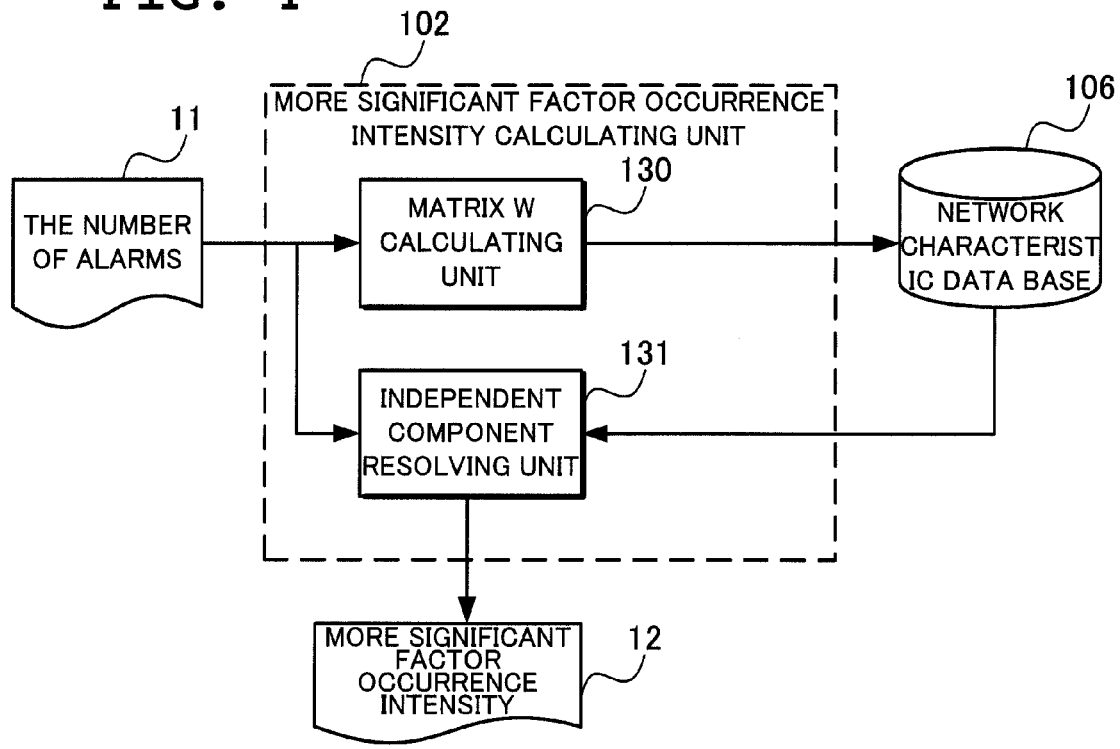

FIG. 11
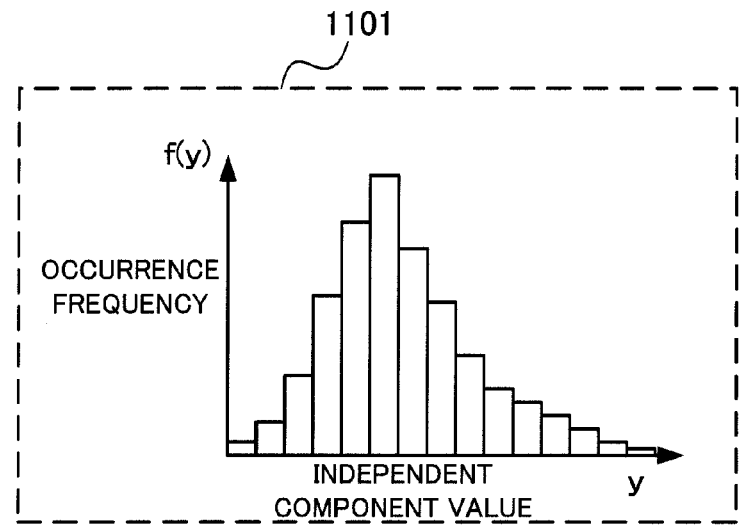
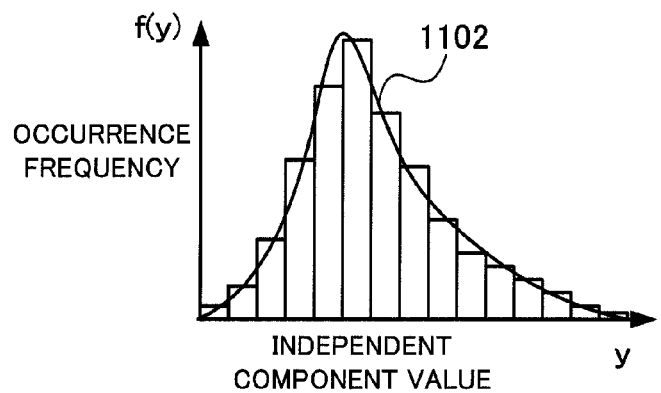
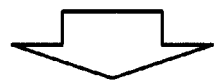
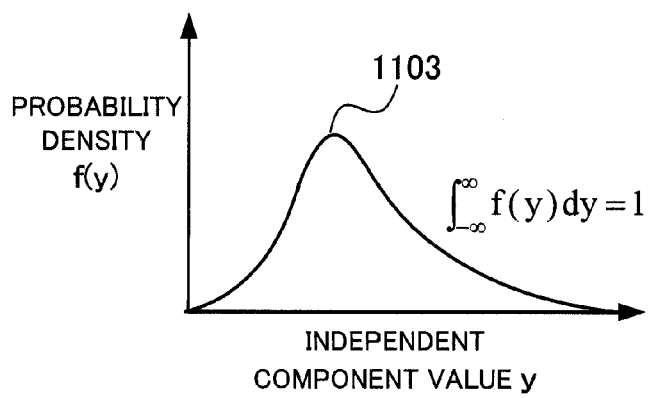

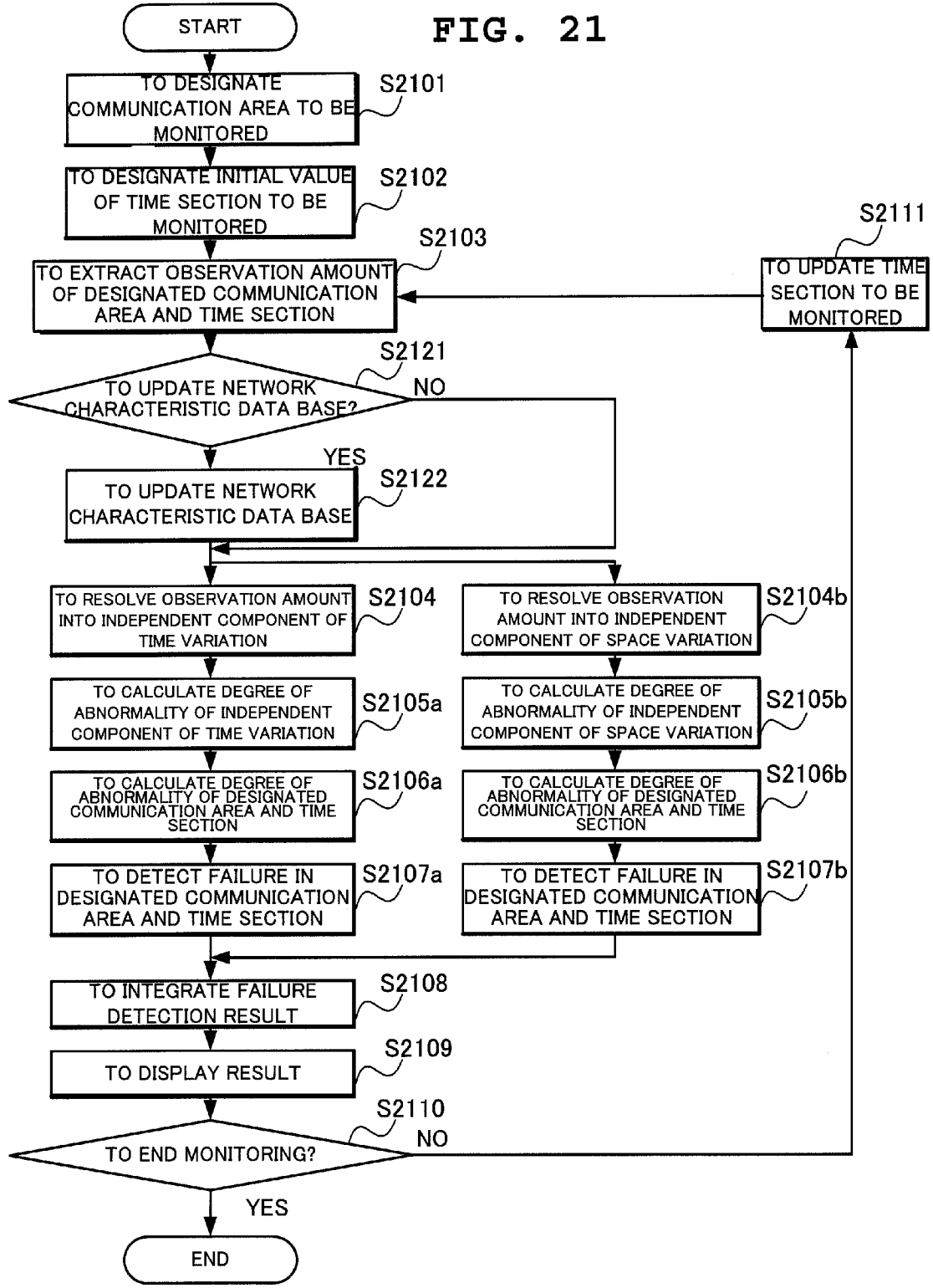

COMMUNICATION NETWORK FAILURE DETECTION SYSTEM, AND COMMUNICATION NETWORK FAILURE DETECTION METHOD AND FAILURE DETECTION PROGRAM

TECHNICAL FIELD

The present invention relates to a communication network failure detection system and, more particularly, a communication network failure detection system, and communication network failure detection method and failure detection program for detecting a failure of a communication network by analyzing information obtained from an alarm log of the communication network.

BACKGROUND ART

It is a common practice that when abnormality occurs in a component of a communication network, it is notified to a management system of the communication network as an alarm and recorded in a log. Maintenance staff of the communication network estimates a fundamental factor of abnormality based on time series information of an alarm recorded in a log and his/her own experience to evaluate the degree of effect exerted on communication service and when improvement is required of the communication network or other case, determines that a failure occurs.

In general, because a management system of a large-scale communication system is daily notified of numbers of alarms, a maintenance staff who manually analyzes a log requires a lot of labor. In addition, since when abnormality occurs on the communication network, numbers of related alarms might occur in chain reaction to hide a crucial alarm suggesting a fundamental factor of the abnormality, a lot of experiences are required for estimating a fundamental factor of abnormality from a log. Under these circumstances, systems for supporting log analysis of this kind and systems for aggregating redundant alarms have been proposed.

One example of art related to a system for supporting log analysis is recited in Japanese Patent Laying-Open No. 2004-318552 (Literature 1). The log analysis supporting system recited in Literature 1 is a system which monitors a log of an intrusion sensing system connected to a communication network to individually observe the number of occurrences of an event (access action) per unit time and calculates and presents the degree of abnormality to notify a manager of an event having abnormal change in the amount of observation. The log analysis supporting system has a function of comparing the amount of observation of logs of a plurality of intrusion sensing systems to determine that the amount of observation is abnormal when a comparison result has a difference larger than a predetermined value.

One example of art related to a system for aggregating redundant alarms is recited in Japanese Patent No. 3082548 (Literature 2). The alarm selection system recited in Literature 2 checks a statistical correlation among alarm occurrence times to classify alarms into units each having synchronicity in which an alarm occurs at the same time or occurs with a fixed time delay, thereby generating a plurality of sets of alarms. Thereafter, by selecting a set of alarms most closed to an occurring event, numerous redundant alarms are aggregated into crucial alarms.

Literature 1: Japanese Patent Laying-Open No. 2004-318552.
Literature 2: Japanese Patent No. 3082548.
Literature 3: Noboru Murata, *Introduction: Independent Component Analysis, *Tokyo Electric University Publishing, 2004.

The above-described related art, however, has a problem that a failure of a communication network can not be detected according to objective basis while comprehensively taking a plurality of alarms output by a management server of the communication network in consideration.

The reason is that while the related art provides a unit for presenting abnormality of an individual alarm, it fails to provide a unit for determining whether a state of a communication network has a failure or not according to an objective basis by integrating these information. When the number of occurrences of each of all the alarms is close to a limit of a normal range to bring the network into an abnormal state as a whole, for example, because the number of occurrences of an individual alarm is within the normal range, the related art is incapable of detecting the abnormality.

According to the present invention, a factor causing a state of output of a single alarm by an alarm system is defined as a less significant factor and a factor causing a state of output of a plurality of alarms in chain reaction is defined as a more significant factor. In this case, the above-described related art has a problem that a degree of abnormality of a communication network can not be evaluated tracing back to a more significant factor.

The reason is that while the related art provides a unit for presenting a degree of abnormality of a single alarm caused by a less significant factor and a unit for classifying alarms into a unit having synchronicity based on time correlation related to an occurrence time and extracting a more significant factor, it fails to provide a unit for estimating a degree of abnormality of a network based on the more significant factor. When a plurality of different more significant factors cause the same alarm, for example, a more significant factor whose effect exerted on a change of the number of occurrences of the alarm in question is weak is buried in variation of other more significant factors whose effects are strong, so that only by monitoring variation in the number of occurrences of the alarm in question or classifying the alarm as is executed by the related art, the more significant factor whose effect is weak can not be detected. This is in particular a serious problem when the frequency of occurrence of alarms due to a more significant factor causing a fatal failure is low.

The above-described related art has a further problem that a state of a communication network to be monitored during a monitoring period can not be evaluated from various aspects.

The reason is that the related art fails to provide a unit for specifically realizing a function of comparing the numbers of alarms obtained from a plurality of management targets to detect their abnormalities, and detects only abnormality of an individual alarm, so that it is impossible to simultaneously compare a state of a geographically adjacent communication network during a monitoring period and a state of the communication network in question as of prior to the monitoring period to comprehensively determine a state of the communication network.

An object of the present invention is to provide a system for analyzing an alarm of a communication network to comprehensively consider occurrence states of a plurality of alarms and evaluating a degree of abnormality of the communication network tracing back to a more significant factor causing the alarm to detect a failure of the communication network based on an objective basis.

A further object of the present invention is to provide a system for detecting a failure of a communication network by simultaneously comparing a state of a communication network to be monitored during a monitoring period with a state of a geographically adjacent communication network during the monitoring period and a state of the communication network in question as of prior to the monitoring period to evaluate a state of the communication network from various aspects.

SUMMARY

According to a first exemplary aspect of the invention, in a communication network for which contents of an alarm issued at the time of a failure of communication are recorded, a communication network failure detection system calculates an occurrence intensity of the more significant factor causing an alarm based on the recording contents of the alarm, and detects a failure derived from the more significant factor of the communication network based on the calculated intensity of occurrence of the more significant factor.

According to a second exemplary aspect of the invention, a communication network failure detection system includes an occurrence intensity calculating unit for a more significant factor for calculating an occurrence intensity of the more significant factor causing an alarm by analyzing the recording contents of the alarm, an occurrence intensity probability distribution calculating unit for calculating a probability distribution of an occurrence intensity of the more significant factor in the communication network at a normal state, a degree of abnormality calculating unit for calculating, with respect to a calculated occurrence intensity of the more significant factor, a degree of probability deviation from an occurrence intensity probability distribution of the more significant factor at the normal state as a degree of abnormality, and a failure detecting unit for detecting a failure derived from the more significant factor in the communication network by comparing the degree of abnormality and a threshold value applied in advance.

According to a third exemplary aspect of the invention, the occurrence intensity calculating unit for the more significant factor includes a time variation parameter extracting unit for extracting a parameter indicative of a time variation in an alarm occurrence frequency from the recording contents of the alarm to consider a value of the parameter indicative of a time variation as an occurrence intensity of the more significant factor, a space variation parameter extracting unit for extracting a parameter indicative of a space variation in an alarm occurrence frequency from the recording contents of the alarm to consider a value of the parameter indicative of a space variation as an occurrence intensity of the more significant factor.

The present invention attains the following effects.

First effect is to realize failure detection whose precision is higher than that obtained by simply monitoring the varying number of occurrences of an alarm caused by coexistence of a plurality of more significant factors.

The reason is that in a communication network which records the contents of an alarm generated at the time of abnormality of communication, the intensity of occurrence of a more significant factor which causes the alarm is calculated from recording contents of the alarm to detect a failure derived from the more significant factor of the communication network based on the calculated intensity of occurrence of the more significant factor.

Second effect is to realize failure detection whose objectivity is higher than that obtained by determining a state of a communication network while monitoring the degree of abnormality of an individual alarm by a maintenance staff.

The reason is that a failure of the communication network is detected by analyzing alarm recording contents to calculate an occurrence intensity of a more significant factor causing an alarm and calculate a probability distribution of occurrence intensities of the more significant factor at a normal state of the communication network and with respect to the calculated occurrence intensity of the more significant factor, calculating a degree of probability derivation from the occurrence intensity probability distribution of the more significant factor at the normal state as a degree of abnormality to compare the degree of abnormality with a predetermined threshold value.

Third effect is to realize failure detection from more aspects than those obtained by monitoring only time variation in the number of alarms in a communication area to be monitored.

The reason is that a failure of the communication network is detected by extracting a parameter indicative of a time variation in an alarm occurrence frequency and a parameter indicative of a space variation in occurrence frequency from alarm recording contents, with values of the parameter indicative of time variation and the parameter indicative of space variation as an occurrence intensity of a more significant factor, calculating a probability distribution of occurrence intensities of the more significant factor in the communication network at the normal state and with respect to the calculated occurrence intensity of the more significant factor, calculating the degree of probability deviation from the occurrence intensity probability distribution of the more significant factor at the normal state as a degree of abnormality to compare the degree of abnormality with a predetermined threshold value.

BRIEF DESCRIPTION OF THE DRAWINGS

FIG. 3 is a structural diagram of an observation amount extracting unit 101 according to the first and second exemplary embodiments of the present invention;

FIG. 4 is a structural diagram of a more significant factor occurrence intensity calculating unit 102 according to the first to third exemplary embodiments of the present invention;

FIG. 11 is a diagram showing one example of a method of calculating an independent component value probability distribution from a set of samples of independent components at a normal state according to the first to third exemplary embodiments of the present invention;

FIG. 21 is a diagram for use in explaining operation of the failure detection system 1 according to the third exemplary embodiment of the present invention.

EXEMPLARY EMBODIMENT

Next, a best mode for implementing the present invention will be described in detail with reference to the drawings.

First Exemplary Embodiment

Figure 1:
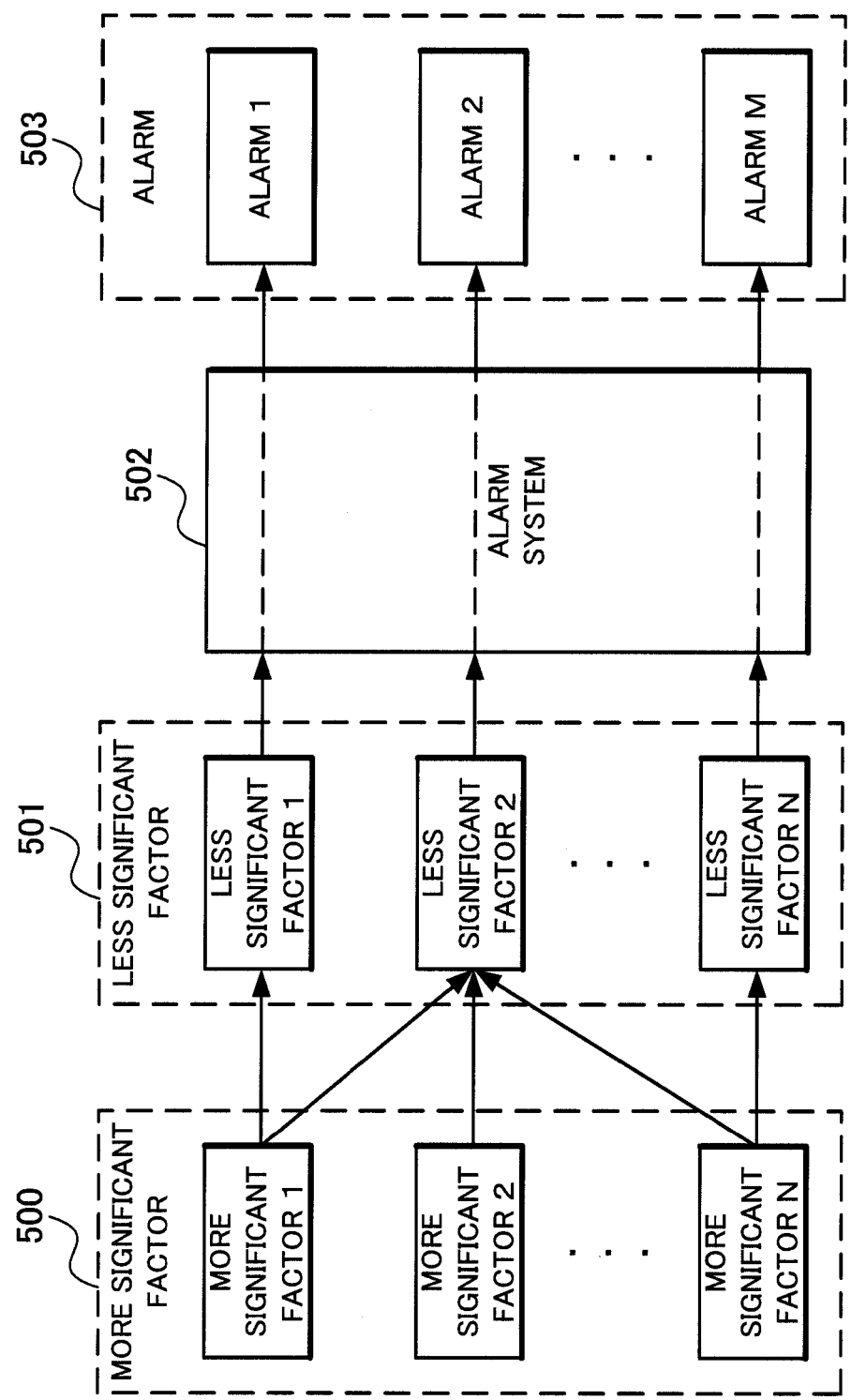
FIG. 1 is a conceptual diagram indicative of a relationship between an occurrence factor of an alarm and the alarm according to a first exemplary embodiment of the present invention.

FIG. 1 is a conceptual diagram showing a relationship between an occurrence factor of an alarm and the alarm in a failure detection system according to a first exemplary embodiment of the present invention.

In the present invention, a factor causing a state where an alarm system 502 outputs a single alarm is defined as a less significant factor 501 and a factor causing a state where a plurality of alarms are output in chain reaction is defined as a more significant factor 500. At this time, the more significant factor 500 causing an alarm induces a single or a plurality of less significant factors 501 which directly cause an individual alarm, and the alarm system 502 senses abnormality caused by these less significant factors 501 to output an alarm 503.

More specifically, among examples of the more significant factor 500 are occurrence of an interfering wave, a temporary increase in the number of communication users, cut-off of a communication path and a failure of a communication device and among examples of the less significant factor 501 are generation of congestion, generation of call acceptance regulation, a shortage of a communication band, a failing of communication path set-up and a loss of a terminal.

In particular, in the present exemplary embodiment, the more significant factor 500 is, among the above-described specific examples of the more significant factor 500, a more significant factor which is peculiar to a communication area to be monitored and is of time variation causing an alarm statistically independent of an occurrence time.

Here, the alarm system 502 has a function of detecting abnormality on the communication network and outputting an alarm. Located in the alarm system 502 is, for example, a management server.

In the present invention, a failure is detected by calculating a value proportional to an occurrence frequency of the more significant factor 500 from a time variation in the number of occurrences of the individual alarm 503 appearing in a log related to a communication area to be monitored, and with the value as an occurrence intensity of the more significant factor 500, monitoring the variation of the occurrence intensity. In particular, in the first exemplary embodiment of the present invention, among factors causing variation in the number of occurrences of the alarm 503 in the communication area to be monitored, a factor statistically independent of an occurrence time is considered as the more significant factor 500.

Structure of the First Exemplary Embodiment

Figure 2:
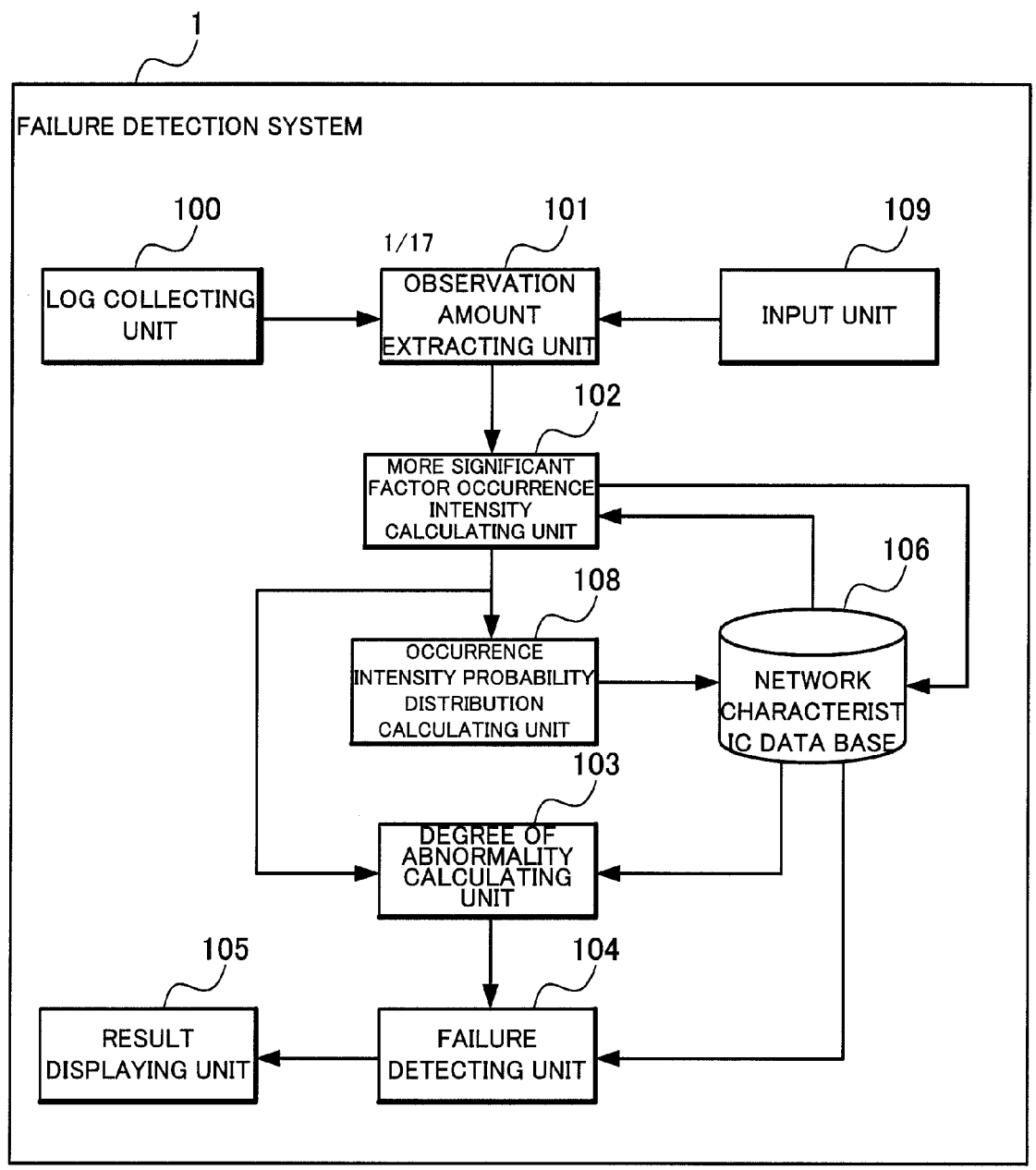
FIG. 2 is a structural diagram showing a communication network failure detection system 1 according to the first and second exemplary embodiments of the present invention.

FIG. 2 is a structural diagram of a communication network failure detection system 1 for implementing the present invention.

The failure detection system 1 according to the present invention comprises a log collecting unit 100 for collecting a log output by a management server (not shown) of the communication network, an observation amount extracting unit 101 for extracting an observation amount necessary for monitoring a state of the communication network from a collected log, a more significant factor occurrence intensity calculating unit 102 for converting an extracted observation amount into an occurrence intensity of the more significant factor 500, an occurrence intensity probability distribution calculating unit 108 for calculating a probability distribution of an occurrence intensity of the more significant factor 500 at the normal state and storing the same in a network characteristic data base 106, a degree of abnormality calculating unit 103 for comparing a value of an occurrence intensity of an individual more significant factor 500 and a probability distribution of an occurrence intensity of the more significant factor 500 at the normal state which is stored in the network characteristic data base 106 to calculate how abnormal the occurrence intensity is (degree of abnormality) and further integrating the degrees of abnormality of a plurality of occurrence intensities to calculate a degree of abnormality of the communication network, a failure detecting unit 104 for comparing the degree of abnormality of the communication network and a threshold value of the degree of abnormality stored in the network characteristic data base 106 and determining a state of the communication network to detect a failure, a result displaying unit 105 for displaying a failure detection result on a display device such as a CRT, and an input unit 109.

FIG. 3 is a structural diagram of the observation amount extracting unit 101.

The observation amount extracting unit 101, which comprises a specific space log extracting unit 120 for extracting a log related to a specific communication area from an alarm log 10 collected by the log collecting unit 100, a specific time log extracting unit 121 for extracting a log related to a specific time section from an extracted log of a specific communication area, and a number of alarms calculating unit 122 for calculating the number of occurrences of each kind of alarm from logs extracted by the specific space log extracting unit 120 and the specific time log extracting unit 121, outputs a number of alarms 11 of a specific space and a specific time (specific time and space region) as the amount of observation.

FIG. 4 is a structural diagram of the more significant factor occurrence intensity calculating unit 102.

As a method of converting a value of a plurality of or single observation amount (the number of alarms 11) by the more significant factor occurrence intensity calculating unit 102 into an occurrence intensity of its more significant factor 500, several methods are possible such as a method of extracting a statistically non-correlative variation component from the observation amount to correlate its value with an occurrence intensity of the more significant factor 500, a method of extracting a statistically independent variation component from the observation amount to correlate its value with the occurrence intensity of the more significant factor 500 and a method of extracting a variation component which is neither statistically completely non-correlative nor independent but is experimentally found to be related to the more significant factor 500 from the observation amount to correlate its value with the occurrence intensity of the more significant factor 500.

Considered in the present exemplary embodiment as one form of a function of converting the observation amount into an occurrence intensity of its more significant factor 500 by the more significant factor occurrence intensity calculating unit 102 is a method of resolving the observation amount into a statically independent variation component and considering the obtained occurrence intensity thereof as an occurrence intensity of the more significant factor 500.

In this case, the more significant factor occurrence intensity calculating unit 102, which comprises a matrix W calculating unit 130 for calculating a matrix necessary for processing of resolving an independent component from the number of alarms 11 of a specific time and space region and an independent component resolving unit 131 for executing resolution operation processing of an independent component, outputs an occurrence intensity of an independent component, that is, a more significant factor occurrence intensity 12 of an alarm.

The matrix W calculated at the matrix W calculating unit 130 is stored in the network characteristic data base 106 and taken out in response to a request from the independent component resolving unit 131.

Figure 5:
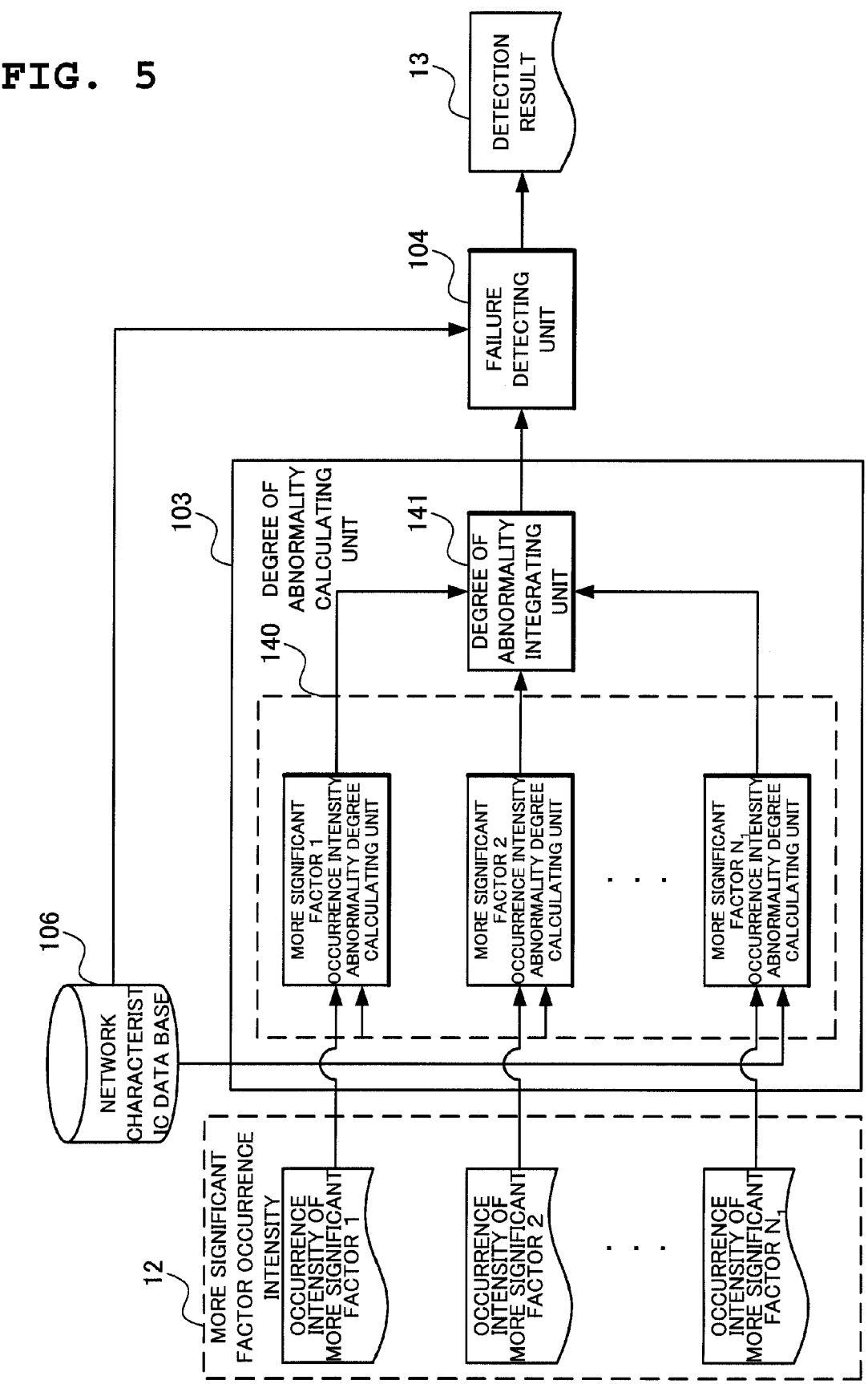
FIG. 5 is a structural diagram of a degree of abnormality calculating unit 103 according to the first and second exemplary embodiments of the present invention.

FIG. 5 is a structural diagram of the degree of abnormality calculating unit 103.

The degree of abnormality calculating unit 103 comprises an occurrence intensity abnormality degree calculating unit 140 for calculating an degree of abnormality of an alarm from its more significant factor occurrence intensity 12 and a degree of abnormality integrating unit 141 for integrating the degree of abnormality of an occurrence intensity of each more significant factor 500 to calculate a degree of abnormality of the communication network.

At the time of calculating a degree of abnormality of an occurrence intensity of the more significant factor 500, an occurrence intensity of the more significant factor 500 stored in the network characteristic data base 106, that is, a probability distribution of an independent component in the normal state is used.

The failure detecting unit 104 detects a failure of the communication network by comparing the degree of abnormality obtained at the degree of abnormality calculating unit 103 and the threshold value stored in the network characteristic data base 106 and ultimately outputs a detection result 13.

Figure 6:
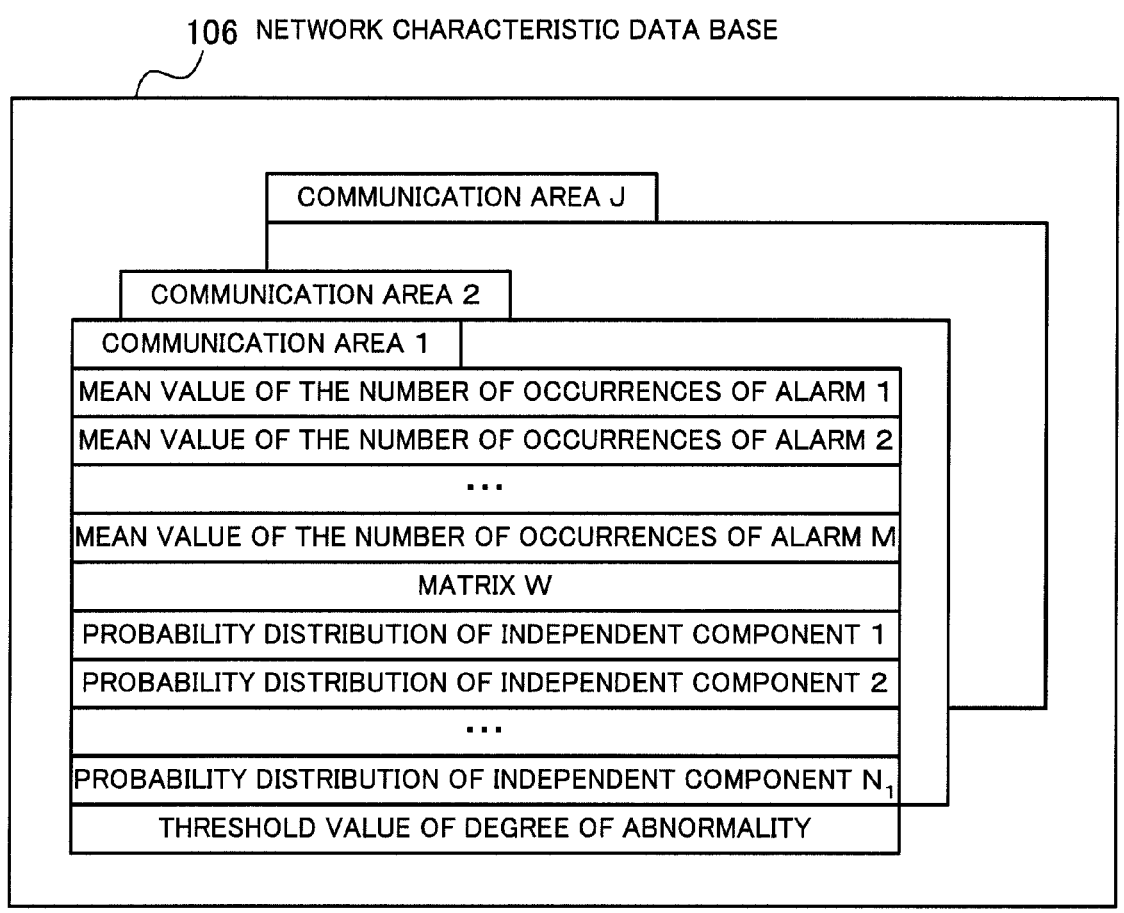
FIG. 6 is a structural diagram of information stored in a network characteristic data base 106 according to the first exemplary embodiment of the present invention.

FIG. 6 is a structural diagram of information stored in the network characteristic data base 106.

The network characteristic data base 106 stores a characteristic parameter indicative of characteristics of the communication network for each communication area J to be monitored. The communication network characteristic parameter is formed of a mean value of the number of occurrences of an individual alarm per time section which is used in preprocessing of the independent component resolving processing, a matrix W calculation value for use in the independent component resolving processing, a probability distribution of a value of each independent component in the normal state for use in calculating the degree of abnormality, and a threshold value of a degree of abnormality for use in failure detection.

Through a keyboard, a network or the like, the input unit 109 receives input of the communication area J whose failure is to be monitored and a time section in which the monitoring should be started which are designated by a maintenance staff to send the same to the observation amount extracting unit 101.

Here, description will be made of a hardware structure of the failure detection system 1 according to the present exemplary embodiment.

Figure 7:
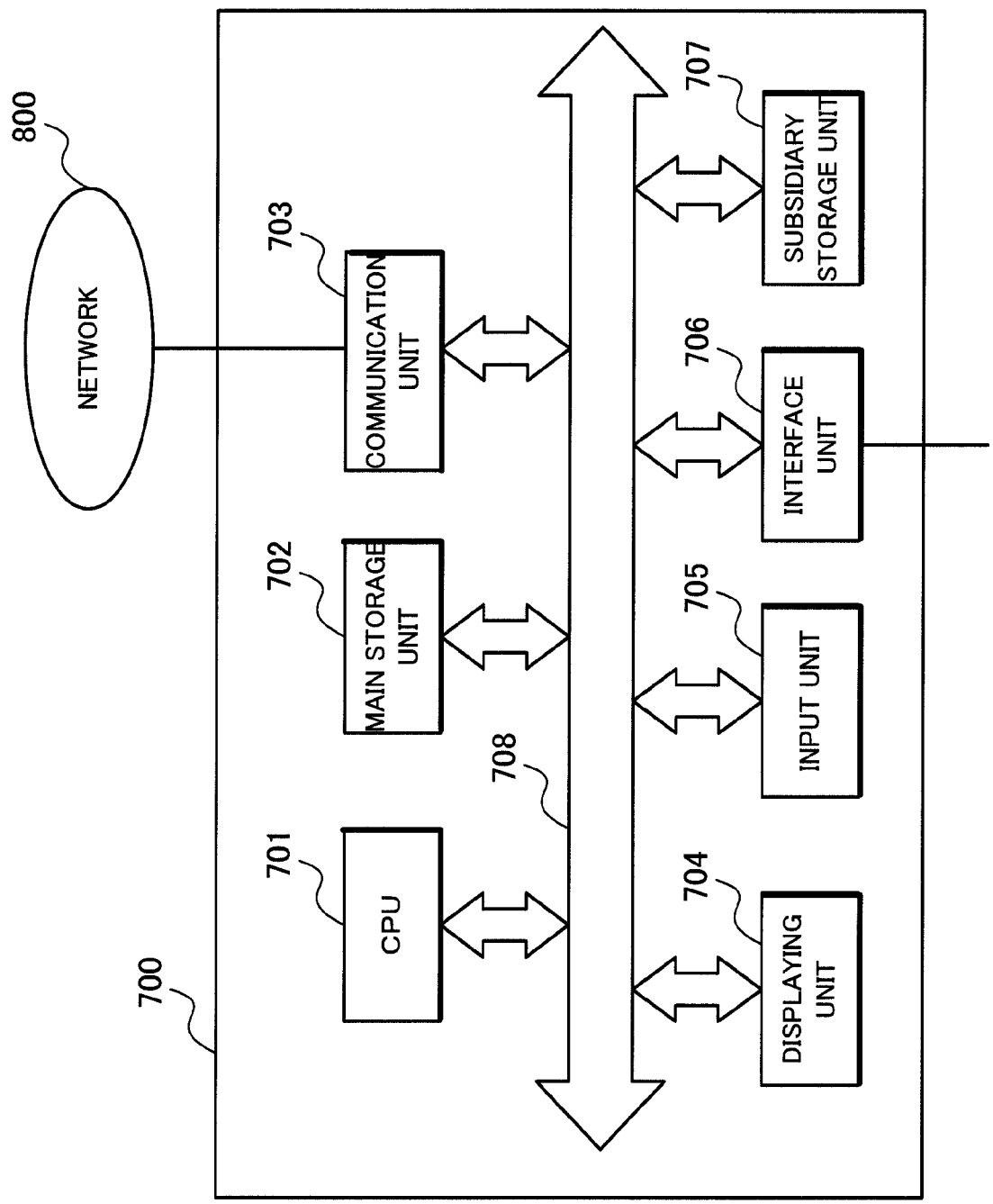
FIG. 7 is a structural diagram of hardware of the failure detection system 1 according to the first exemplary embodiment of the present invention.

FIG. 7 is a block diagram showing a hardware structure of the failure detection system 1 according to the present exemplary embodiment.

With reference to FIG. 7, the failure detection system 1 according to the present exemplary embodiment, which can be realized as the same hardware structure as that of a common computer device, comprises a CPU (Central Processing Unit) 701, a main storage unit 702 which is a main memory such as a RAM (Random Access Memory) for use as a data working area or a data temporary save area, a communication unit 703 for transmitting and receiving data through a network 800, a displaying unit 704 such as a liquid crystal display, a printer or a speaker, an input unit 705 such as a keyboard or a mouse, an interface unit 706 connected to a peripheral apparatus for transmitting and receiving data, a subsidiary storage unit 707 as a hard disk device formed of a non-volatile memory such as a ROM (Read Only Memory), a magnetic disk or a semiconductor memory, and a system bus 708 for connecting the above-described components of the present information processing device with each other.

The failure detection system 1 according to the present exemplary embodiment has its operation realized not only as hardware with a circuit part formed of a hardware part such as LSI (Large Scale Integration) having a program realizing such functions as described above incorporated mounted on the failure detection system 1 but also as software by executing a program which provides each function of the above-described respective components by the CPU 701 on the computer processing device.

More specifically, the CPU 701 realizes the above-described respective functions by software by loading a program stored in the subsidiary storage unit 707 into the main storage unit 702 and executing the same to control operation of the failure detection system 1.

Operation of the First Exemplary Embodiment

Next, with reference to FIG. 2 through FIG. 12, operation of the first exemplary embodiment according to the present invention will be detailed.

Figure 8:
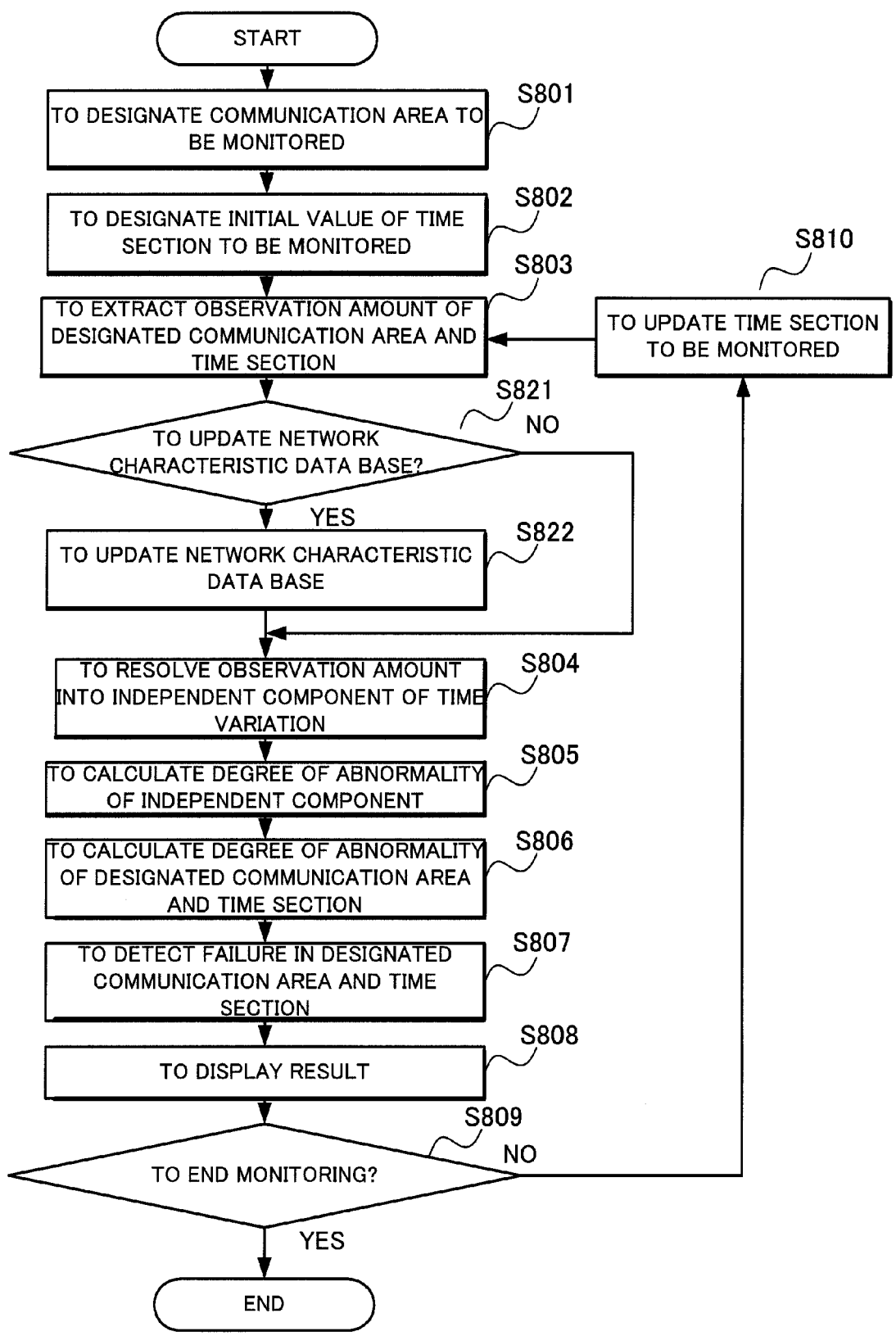
FIG. 8 is a diagram for use in explaining operation of the failure detection system 1 according to the first exemplary embodiment of the present invention.

FIG. 8 is a diagram for use in explaining operation of the failure detection system 1 according to the present exemplary embodiment.

The alarm log 10 output by a management server of the communication network is provided as binary or text data recorded in an electronic medium. The data at least includes time information indicative of time and date when an alarm occurs, identification information which identifies a communication area in which an alarm occurs and information related to a kind of an occurring alarm.

At first, applied to the input unit 109 are a communication area whose failure is to be monitored and a time section where the monitoring is started (initial value) which are designated by the maintenance staff (Step S801, Step 802).

Then, the observation amount extracting unit 101 extracts a kind of alarm occurring in the time section in the communication area designated and the number of occurrences of the alarm as the observation amount (Step S803).

Figure 9:
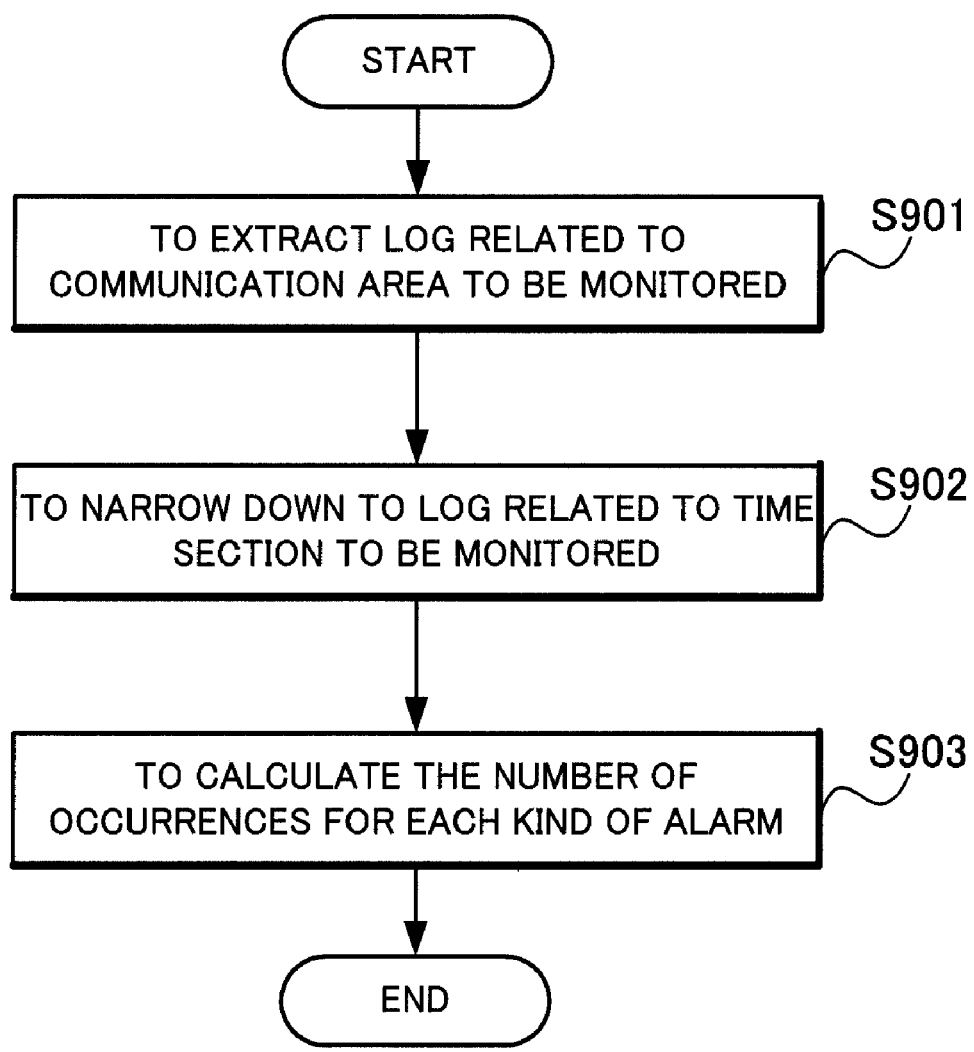
FIG. 9 is a diagram showing operation of extraction processing of the observation amount extracting unit 101 according to the first exemplary embodiment of the present invention.

FIG. 9 is a diagram showing operation of extraction processing of the observation amount extracting unit 101 at the above-described Step S803.

As shown in FIG. 9, in this processing, first the specific space log extracting unit 120 in the observation amount extracting unit 101 extracts only a log related to a communication area to be monitored from the alarm log 10 received from the log collecting unit 100 based on identification information of a communication area in which an alarm occurs (Step S901).

Next, the specific time log extracting unit 121 in the observation amount extracting unit 101 narrows down logs extracted by the specific space log extracting unit 120 to a log related to a time section to be monitored based on time information indicative of time and date when the alarm occurs (Step S902).

Thereafter, the number of alarms calculating unit 122 in the observation amount extracting unit 101 calculates the number of occurrences of each kind of alarm with respect to the log narrowed down by the specific time log extracting unit 121 (Step S903).

Thus calculated number of occurrences is extracted as the observation amount at the above-described Step S803.

Return to the description of the operation of the failure detection system 1 according to the present exemplary embodiment, next, the more significant factor occurrence intensity calculating unit 102 resolves the number of occurrences of an individual alarm appearing in the log into variation components statistically independent of an occurrence time to calculate an occurrence intensity of the more significant factor 500 (Step S804).

In the present exemplary embodiment, used as a method of resolving the number of occurrences of an alarm into statistically independent variation components is an independent component analysis method.

The independent component analysis method is a method of converting an observation signal vector x(t) which is obtained by making a number M of observation amounts at time t as indicated by a mathematical expression (1) into a signal vector y(t) formed of a number N of statistically independent components as shown in a mathematical expression (2) by using a matrix W of N×M rows as illustrated in a mathematical expression (3).

$$x(t)=(x_1(t),x_2(t),\ldots,x_M(t))^T \quad \text{expression (1)}$$

$$y(t)=(y_1(t),y_2(t),\ldots,y_N(t))^T \quad \text{expression (2)}$$

$$y(t)=W_X(t) \quad \text{expression (3)}$$

Value of the matrix W is determined by a learning algorithm by using a sample of an observation signal vector such that the signal vector y(t) satisfies an index of independency. The index of independency and the learning algorithm are detailed in Literature 3, whose one example will be described in a specific example which will be described later in the present invention.

In the present exemplary embodiment, a value obtained by making the number of occurrences of an individual alarm in a time section of a designated communication area into a vector is considered as an observation signal vector. The average number of occurrences of an individual alarm is subtracted in advance from each element of a vector such that a mean value of the observation signal vector goes zero.

Here, when the network characteristic data base 106 is yet to be set up, determination is made to update the network characteristic data base 106 at Step S821 and set up the network characteristic data base 106 at Step S822 prior to actual failure monitoring of the communication network.

Figure 10:
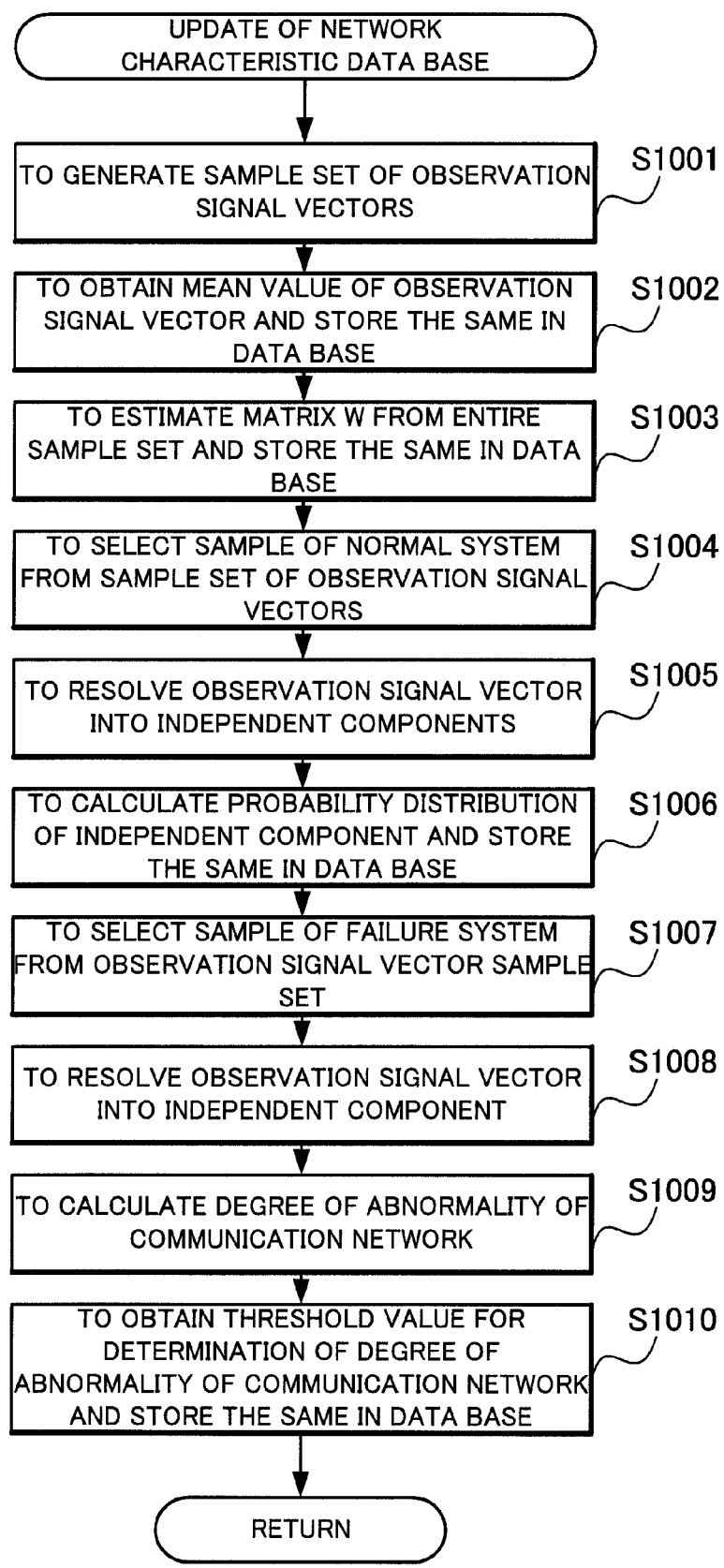
FIG. 10 is a diagram for use in explaining operation of set-up processing of the network characteristic data base 106 according to the first to third exemplary embodiments of the present invention.

FIG. 10 is a diagram for use in explaining operation of set-up processing of the network characteristic data base 106 at Step S822.

First, at Step S1001, with an observation signal vector obtained for each time section in a communication area (communication area J) to be monitored as a sample, generate a sample set including both samples at the normal state and at the time of a failure.

Next, at Step S1002, obtain a mean value of an observation signal vector within the sample set to consider a vector obtained by subtracting the mean value vector from each sample vector in the sample set as a new sample vector, as well as storing an average number of occurrences of each alarm as an element of the means value vector in question in the network characteristic data base 106.

Further at Step S1003, calculate a matrix W from the sample set to store the same in the network characteristic data base 106.

Thereafter, at Step S1004, select a sample of an observation signal vector obtained when the communication area J to be monitored is in the normal state from the sample set.

Then at Step S1005, resolve the sample selected at Step S1004 into independent components.

Subsequently, at Step S1006, calculate a probability distribution of a value of an independent component from the independent component sample set at the normal state which is generated at Step S1005 and store the same in the network characteristic data base 106.

At Step S1007, select a sample of an observation signal vector obtained when the communication area J to be monitored is at a failure state from the sample set.

Then, at Step S1008, resolve each sample selected at Step S1007 into an independent component.

Thereafter, at Step S1009, obtain the degree of abnormality of the communication network which is an integration of the degrees of abnormality of independent component values.

At Step S1010, store a threshold value of the degree of abnormality determined based on the distribution of the degree of abnormality of the communication network at the time of a failure or on operation policy in the network characteristic data base 106.

FIG. 11 is a diagram showing one example of a method of calculating an independent component value probability distribution from the independent component sample set as of the normal state.

First, from the independent component sample set as of the normal state, generate a histogram 1101 of an independent component value with the y axis as a value of the independent component and the f(y) axis as an independent component occurrence frequency, then obtain an approximate curve 1102 from the histogram 1101 and lastly, consider a curve obtained by multiplying the approximate curve 1102 by a constant number such that with a variable as x, an integration of the approximate curve 1102 has 1 as an independent component probability distribution 1103.

In the present exemplary embodiment, the same matrix W is used by observation signal resolving processing in all the time sections of the communication area to be monitored. When determination is made that after a lapse of a long time after the matrix W is calculated, the characteristics of the communication area might change drastically, determine to update the network characteristic data base 106 at Step S821 and newly calculate an average number of occurrences of an alarm, the matrix W, an independent component probability distribution as of the normal state and a threshold value of the degree of abnormality to update the network characteristic data base 106 at Step S822.

Also in the present exemplary embodiment, for each different communication area to be monitored, the matrix W stored in the network characteristic data base 106 is taken out.

The present invention detects a failure of the communication network by monitoring a value of an individual independent component of the observation amount obtained by using such a matrix W peculiar to the communication area as described above. More specifically, obtain a degree of abnormality with respect to a value of an individual independent component (Step S805). Furthermore, by integrating them, obtain a degree of abnormality of the communication network in the designated communication area and time and space (Step S806) and compare the degree of abnormality of the communication network and a threshold value prepared in advance to detect a failure (Step S807).

Calculation of the degree of abnormality with respect to an independent component value employs a statistical method.

Figure 12:
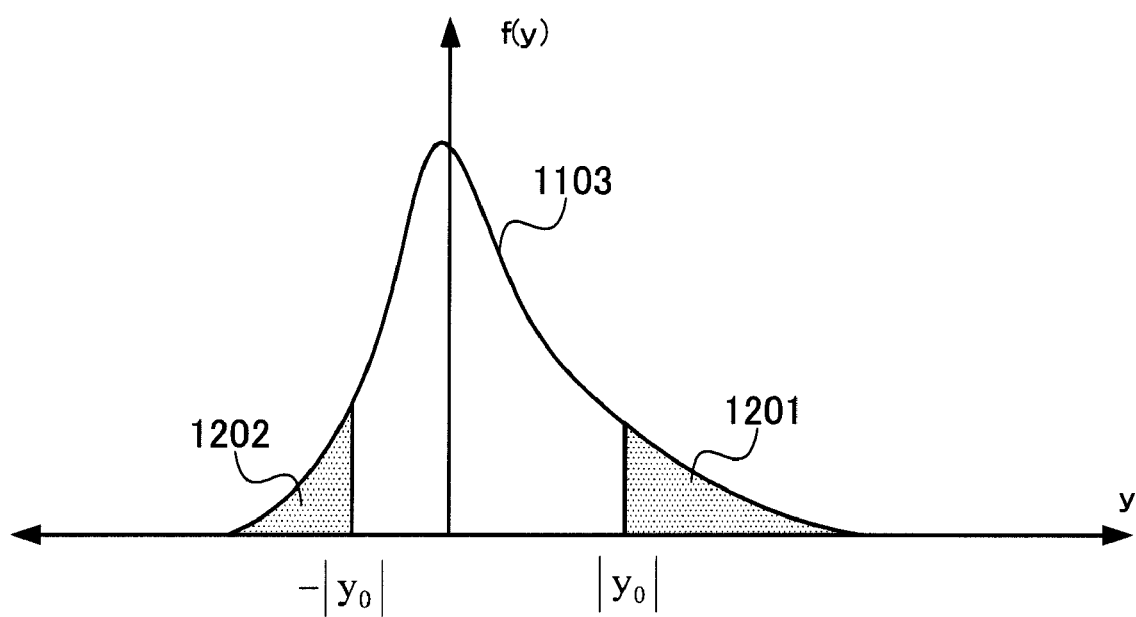
FIG. 12 is a diagram for use in explaining a degree of abnormality calculating method using a statistical manner according to the first to third exemplary embodiments of the present invention.

FIG. 12 is a diagram for use in explaining a degree of abnormality calculating method using a statistical method.

The independent component abnormality degree calculating unit 140 uses an upper side probability 1201 or a lower side probability 1202 or a both side probability as a sum of them as an index for quantizing the degree of deviation of an independent component value from the probability distribution 1103 represented by the function f(y) to output the obtained value as a degree of abnormality of the independent component value. When the both side probability is used, for example, obtain a degree g(y0) of abnormality of an independent component y0 by a mathematical expression (4). The larger thus obtained degree of abnormality is, the smaller value it represents.

$$g(y_0) = \int_{-\infty}^{-|y_0|} f(y)\,dy + \int_{|y_0|}^{\infty} f(y)\,dy \qquad \text{expression (4)}$$

A degree of abnormality of the communication network, that is, a degree of abnormality in a specific time section in a specific communication area to be monitored is obtained by integrating a degree of abnormality of an individual independent component value in the relevant section.

Since the degree of abnormality is an independent event occurrence probability, as a degree of abnormality obtained by integrating a degree of abnormality of an individual independent component value, a product of degrees of abnormality of individual independent component values is used in the present invention. In this case, a degree of abnormality ultimately obtained is equivalent to an occurrence probability of a product event of independent events.

Product of the degrees of abnormality of individual independent component values can be considered as a probability that a plurality of more significant factors 500 independent in time in causing an alarm in the communication area will occur simultaneously at a higher than certain frequency.

Thus, when the probability is smaller than a threshold value set in advance, considering that an event which will rarely occur at the normal state occurs, determine at Step S807 that the time section in the communication area to be monitored is at the failure state to detect the failure.

At Step S808, display a result of the failure detection obtained at Step S807 on the result displaying unit 105 such as a CRT.

The result displaying unit 105 displays, other than that described above, a list of a degree of abnormality of the communication network in the communication area to be monitored and the time section, a mean value and a variance value of the degree of abnormality of the communication network at the normal state, a degree of abnormality of each independent component value based on which the above-described degree of abnormality is calculated, a mean value and a variance value of the degree of abnormality of each independent component value at the normal state, and a number of occurrences of each alarm obtained by inversely converting each independent component.

Inverse conversion of an independent component can be realized by multiplying an inverse matrix $W^{-1}$ of the matrix W from the left side in the mathematical expression (3).

At Step S809, confirm whether to end the monitoring or not and when not to end, update the time section to be monitored to a subsequent section at Step S810 and return to extraction of an observation amount at Step S803 to hereafter continue monitoring while sequentially advancing a time section until instructed to end.

Effects of the First Exemplary Embodiment

Next, effects of the present exemplary embodiment will be described.

In the present exemplary embodiment, since the number of occurrences of an alarm caused by a plurality of factors mixed is separated into a number of occurrences for each of the plurality of more significant factors 500 to convert the separated plurality of numbers of alarm occurrences into an occurrence intensity of each more significant factor 500 and comprehensively monitor the plurality of occurrence intensities, thereby detecting a failure, failure detection whose precision is higher can be realized than that obtained by simply monitoring the number of occurrences of an alarm caused by a plurality of factors mixed.

Furthermore, because failure determination is executed by comparing a degree of abnormality of an occurrence intensity of the more significant factor 500 which is turned into a numeric value by a statistical method with a threshold value, objectivity of the determination is high.

Moreover, since a failure is detected by monitoring a component of time variation in the number of alarms within the communication area to be monitored, a failure indicating more abnormal time variation in the number of alarms in the same communication area can be detected than that in each time section at the normal state.

Second Exemplary Embodiment

Structure of the Second Exemplary Embodiment

The second exemplary embodiment corresponds to the first exemplary embodiment shown in FIG. 2 and adopts the same basic structure as that of the first exemplary embodiment.

Accordingly, description will be made mainly of a difference from the above-described first exemplary embodiment, and that of the common components to those of the first exemplary embodiment will be appropriately omitted.

Figure 13:
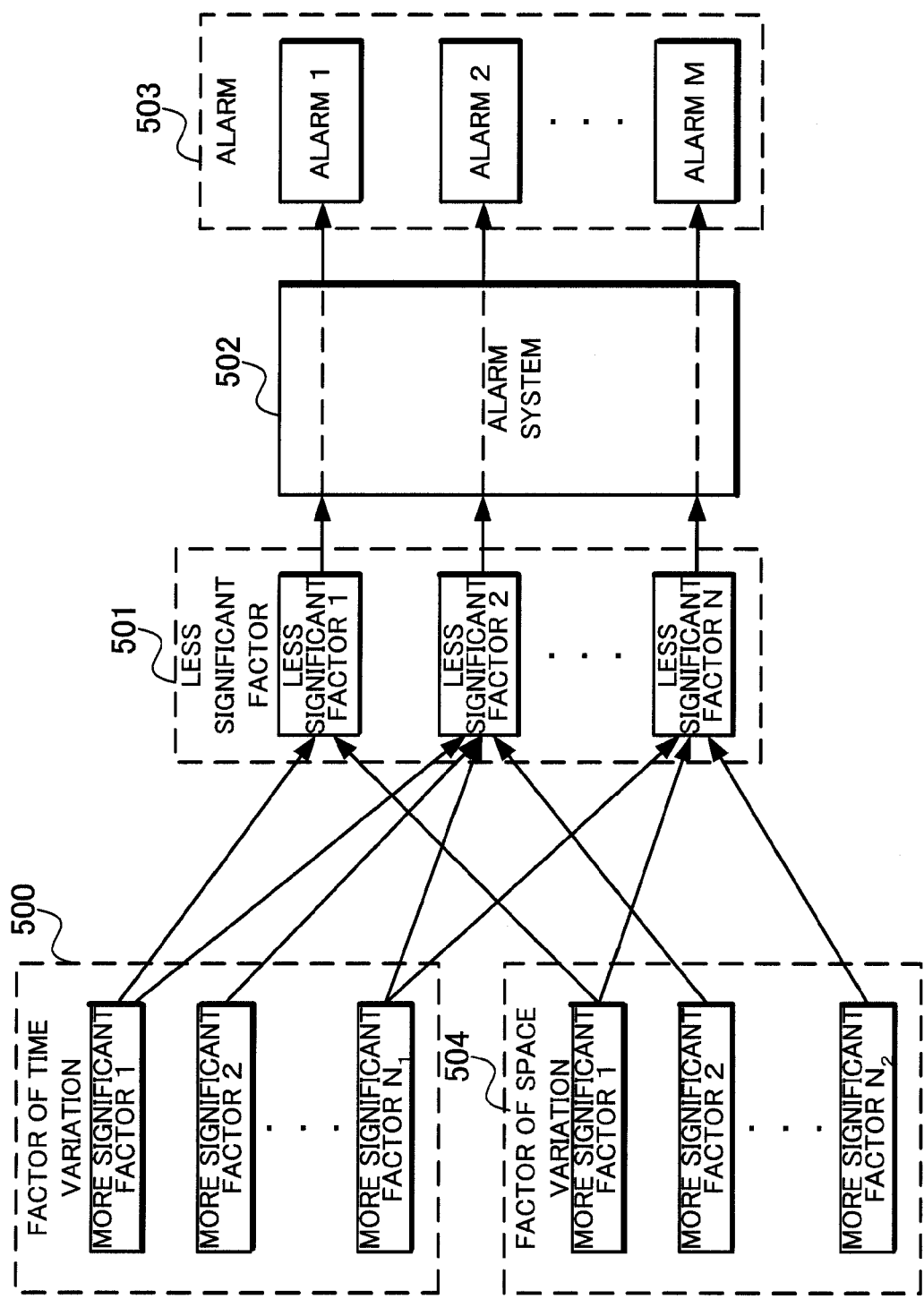
FIG. 13 is a conceptual diagram indicative of a relationship between an occurrence factor of an alarm and the alarm according to the second exemplary embodiment of the present invention.

FIG. 13 is a conceptual diagram showing a relationship between an occurrence factor of an alarm and the alarm in a failure detection system according to the second exemplary embodiment of the present invention.

In the present exemplary embodiment, more significant factors causing the number of alarm occurrences to vary in a communication area to be monitored include a more significant factor 500 of time variation peculiar to a place (space) and varying with time and a more significant factor 504 of space variation peculiar to time and varying with a space.

In particular, in the present exemplary embodiment, the more significant factor 500 is the same as the more significant factor 500 of time variation in the first exemplary embodiment, and among specific examples of the more significant factor 500 in the first exemplary embodiment, the more significant factor 504 is a more significant factor of space variation which is peculiar to time to be monitored and varies along a communication area.

By inputting a communication area whose failure is to be monitored and a time section in which the monitoring is to be started which are designated by the maintenance staff by the input unit 109, the first exemplary embodiment detects a failure caused by the more significant factor 500 of time variation peculiar to the communication area to be monitored and statistically independent of an occurrence time among factors causing the number of alarm occurrences in the communication area to be monitored to vary, while the present exemplary embodiment detects a failure caused by the more significant factor 504 of space variation peculiar to the time section to be monitored and statistically independent of an occurrence place in an area formed of a peripheral communication area geographically adjacent to the communication area to be monitored among factors causing the number of alarm occurrences in the communication area to be monitored to vary.

In the present exemplary embodiment, an observation signal vector is assumed to be a value obtained by making the number of occurrences of an individual alarm into a vector similarly to the first exemplary embodiment. The observation signal vector, however, differs in that it is an observation signal vector x(s) as a function of a position s in a time section to be monitored as represented by a mathematical expression (5) and its corresponding signal vector is similarly a function y(s) of the position s as represented by a mathematical expression (6) from the first exemplary embodiment in which both are a function of time t. Furthermore, in the present exemplary embodiment, a matrix W and an independent component probability distribution are calculated for each different time section to be monitored and stored in the network characteristic data base 106.

$$x(s)=(x_1(s), x_2(s), \ldots, x_M(s))^T \quad \text{expression (5)}$$

$$y(s)=(y_1(s), y_2(s), \ldots, y_N(s))^T \quad \text{expression (6)}$$

Figure 14:
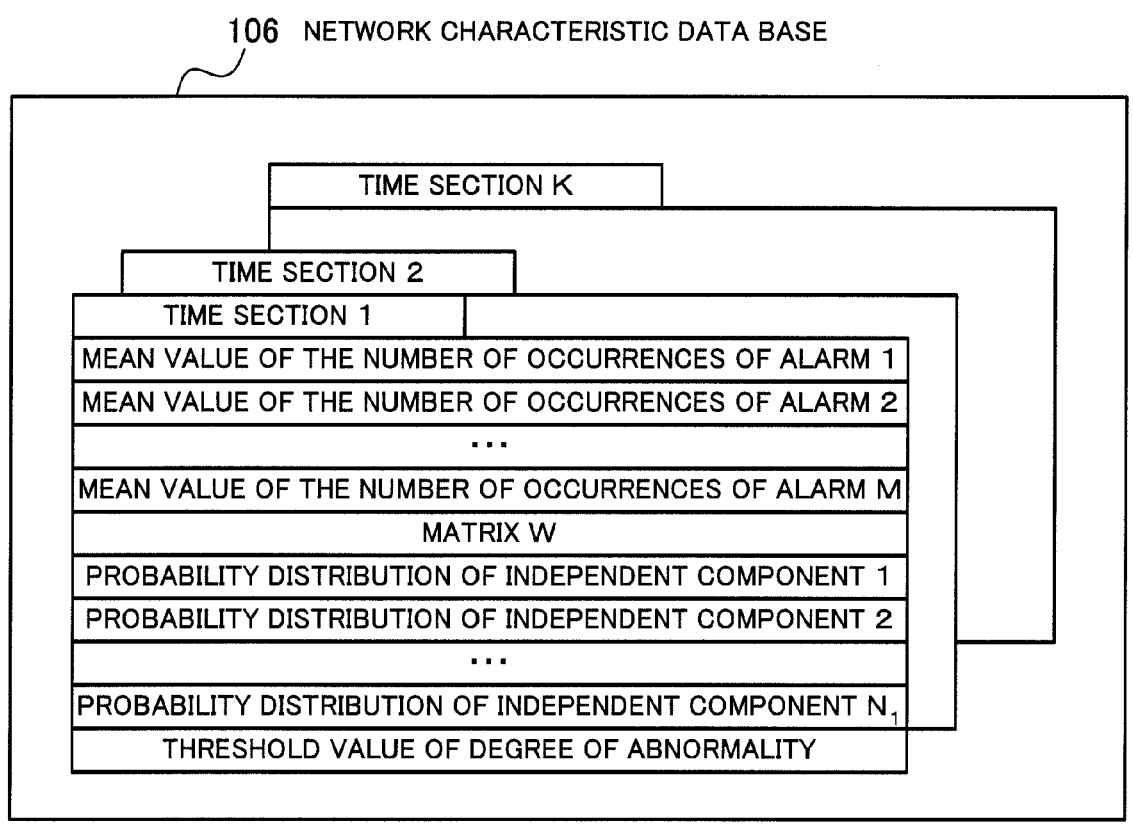
FIG. 14 is a structural diagram of information of the network characteristic data base 106 according to the second exemplary embodiment of the present invention.

FIG. 14 is a structural diagram of information stored in the network characteristic data base 106 for use in implementing the failure detection system 1 according to the present exemplary embodiment.

The network characteristic data base 106 according to the present exemplary embodiment differs in that a characteristic parameter indicative of characteristics of the communication network is stored for each time section K to be monitored from the first exemplary embodiment in which the parameter is stored for each communication area J to be monitored.

The characteristic parameter of the communication network in the network characteristic data base 106 according to the present exemplary embodiment is formed of a mean value of the number of occurrences per communication area of an individual alarm for use in preprocessing of independent component resolving processing, a calculation value of a matrix W for use in independent component resolving processing, a probability distribution of a value of each independent component at the normal state which is for use in calculation of a degree of abnormality, and a threshold value of a degree of abnormality for use in failure detection.

In set-up processing of the network characteristic data base 106 according to the present exemplary embodiment, similarly to Step S1001 shown in FIG. 10, for each different time section K to be monitored, first generate a sample set including both samples as of the normal state and as of a failure state, with an observation signal vector in the relevant time section K obtained from a peripheral communication area geographically adjacent to the communication area to be monitored as a sample.

Thereafter, obtain a characteristic parameter to be stored in the network characteristic data base 106 for each time section K to be monitored according to the update processing shown in FIG. 10 and store the same in the network characteristic data base 106 similarly to the first exemplary embodiment.

Operation of the Second Exemplary Embodiment

Figure 15:
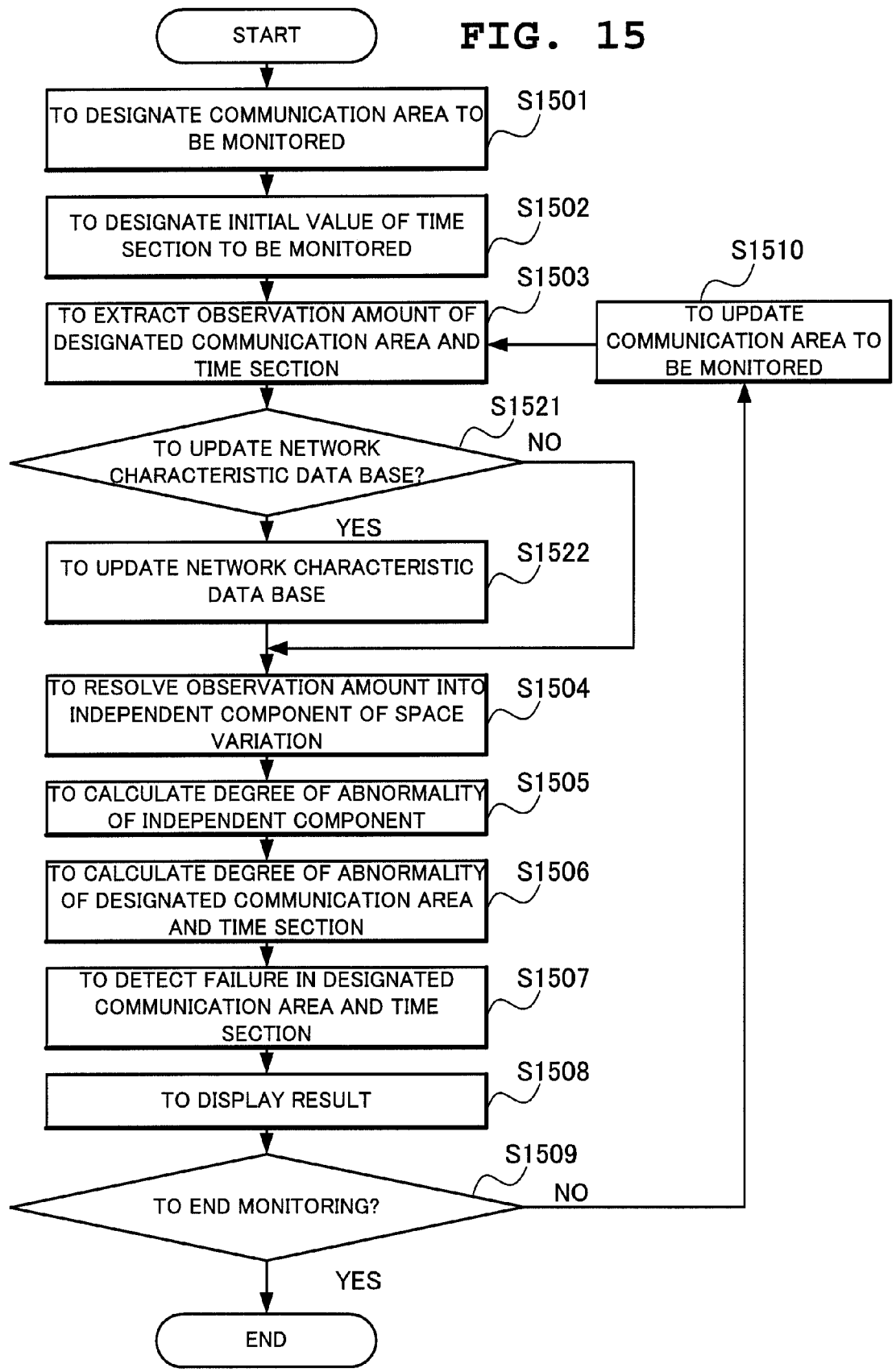
FIG. 15 is a diagram for use in explaining operation of the failure detection system 1 according to the second exemplary embodiment of the present invention.

FIG. 15 is a diagram for use in explaining operation of the failure detection system 1 according to the present exemplary embodiment.

Operation of the failure detection system 1 according to the present exemplary embodiment differs from Step S803 of the first exemplary embodiment shown in FIG. 8 in an observation amount extracting method at Step S1503.

Figure 16:
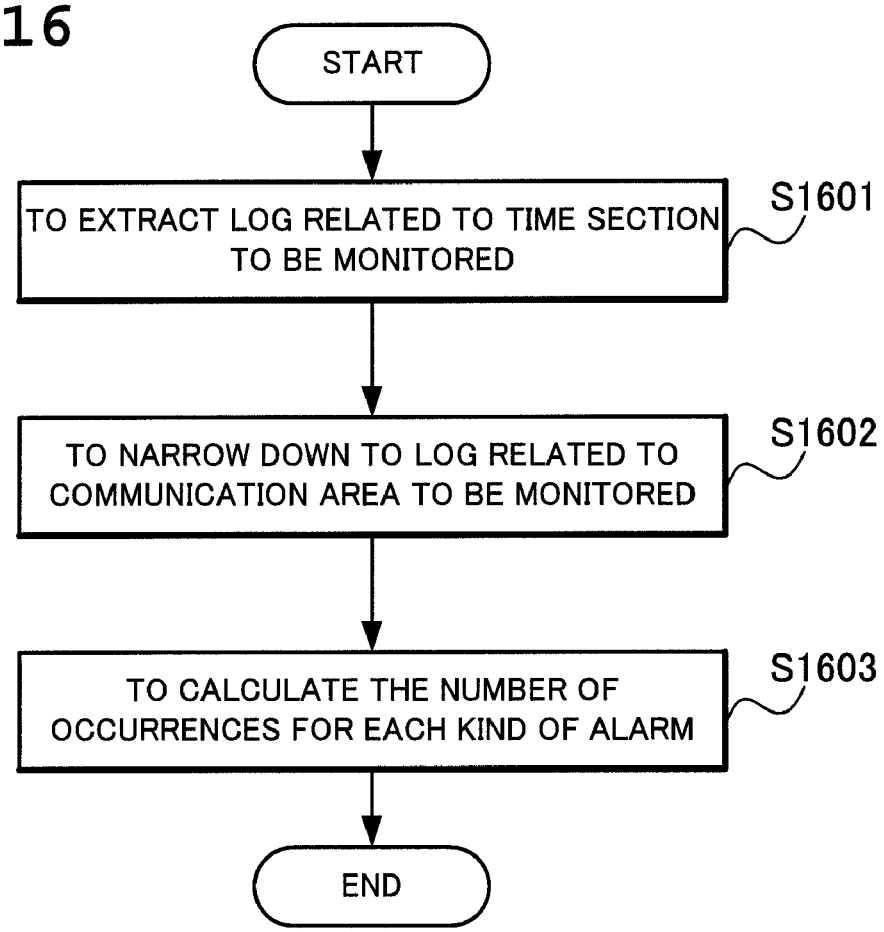
FIG. 16 is a diagram showing operation of extraction processing of the observation amount extracting unit 101 according to the first exemplary embodiment of the present invention.

FIG. 16 is a diagram showing operation of processing of extracting an observation amount at Step S1503 according to the present exemplary embodiment.

Operation of observation amount extracting processing according to the present exemplary embodiment differs in extracting logs related to a time section to be monitored (Step S1601), then, as to the extracted log, narrowing down to a log related to a plurality of peripheral communication areas including the communication area to be monitored (Step S1602) and calculating the number of occurrences for each kind of alarm (Step S1603) from the operation of the observation amount extracting processing according to the first exemplary embodiment in which after extracting logs related to the communication area to be monitored (Step S901), as to the extracted logs, narrowing-down to a log related to the time section to be monitored is executed (Step S902) to calculate the number of occurrences for each kind of alarm (Step S903).

In addition, the operation of the present exemplary embodiment differs in resolving an observation amount into not an independent component of time variation but into an independent component of space variation at Step S1504 from the operation of the first exemplary embodiment in which the observation amount is resolved not into an independent component of space variation but into an independent component of time variation at Step S804 shown in FIG. 8.

Furthermore, the operation of the present exemplary embodiment differs in extracting a matrix W stored in the network characteristic data base 106 for each different time section to be monitored at Step S1504 from the operation of the first exemplary embodiment in which a matrix W stored in the network characteristic data base 106 is extracted for each different communication area to be monitored at Step S804 shown in FIG. 8.

Moreover, the operation of the present exemplary embodiment differs in extracting a probability distribution of an independent component stored in the network characteristic data base 106 for each different time section to be monitored when calculating a degree of abnormality at Step S1506 from the operation of the first exemplary embodiment in which a probability distribution of an independent component stored in the network characteristic data base 106 is extracted for each different communication area to be monitored at Step S806 shown in FIG. 8.

In addition, the operation of the present exemplary embodiment differs in extracting a threshold value of a degree of abnormality stored in the network characteristic data base 106 for each different time section to be monitored when detecting a failure at Step S1507 from the operation of the first exemplary embodiment in which a threshold value of a degree of abnormality stored in the network characteristic data base 106 is extracted for each different communication area to be monitored at Step S807 shown in FIG. 8.

In the present exemplary embodiment, while the matrix W is selectively used for each time section to be monitored, even when a communication area to be monitored differs, as song as a time section to be monitored is the same, the same matrix W corresponding to that time section is used.

At this time, with a determination basis for equality between time sections loosen, the same matrix W may be used to determine, for example, a time section belonging to the same time zone of a day to be the same time section even on a different day.

When determination is made that there is a possibility that characteristics of a plurality of peripheral communication areas including a communication area to be monitored would drastically change due to a lapse of a long time after calculation of the matrix W, determine to update the network characteristic data base 106 at Step S821 and newly estimate the average number of occurrences of an alarm, a matrix W, a probability distribution of an independent component and a threshold value of a degree of abnormality to update the network characteristic data base 106 at Step S822.

Other operation of the failure detection system 1 according to the present exemplary embodiment is the same as the corresponding operation of the failure detection system 1 according to the first exemplary embodiment shown in FIG. 8.

Effects of the Second Exemplary Embodiment

Next, effects of the present exemplary embodiment will be described.

Since a failure is detected by monitoring a component of space variation in the number of alarms in a time section (time section K) to be monitored, the present exemplary embodiment enables detection of a failure of a communication area to be monitored in which the number of alarms shows more abnormal space variation than in a peripheral communication area at the normal state within the same time section.

Third Exemplary Embodiment

Figure 17:
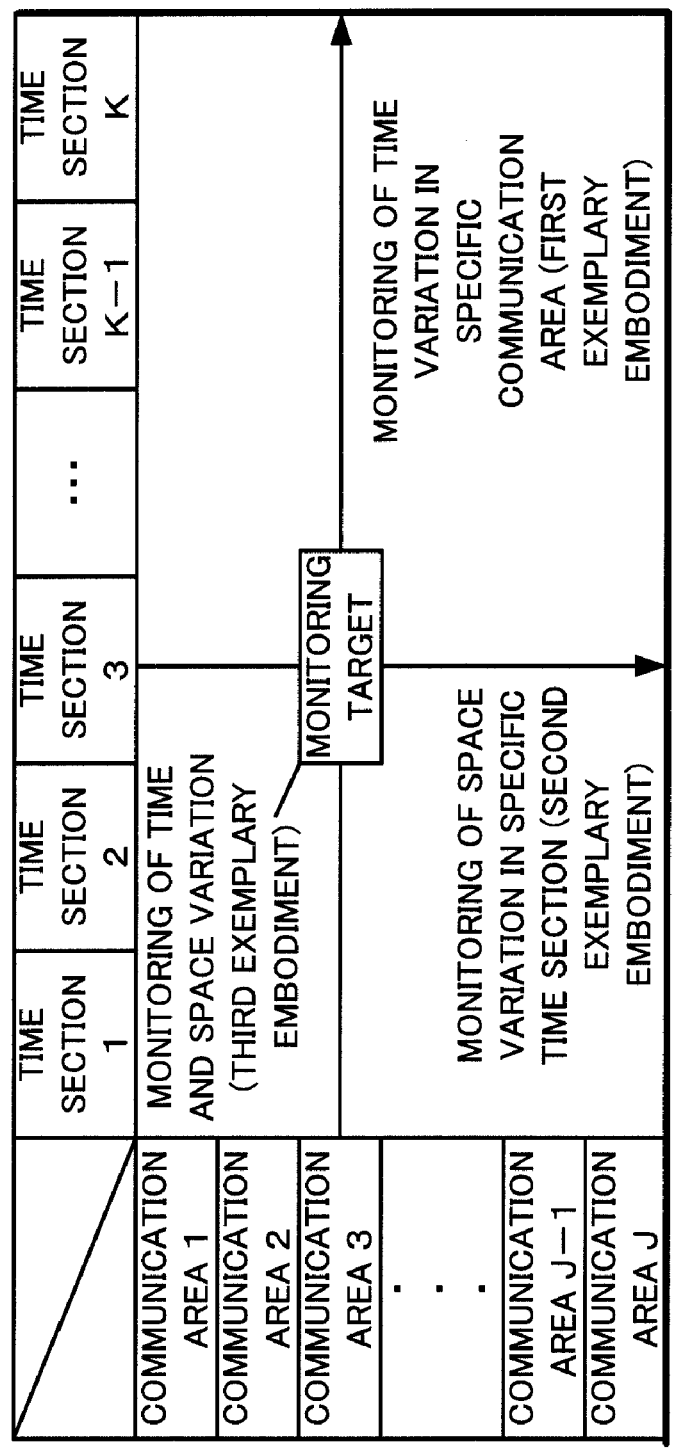
FIG. 17 is a diagram for use in explaining characteristics of the first to third exemplary embodiments of the present invention.

FIG. 17 is a diagram for use in explaining characteristics of the first to third exemplary embodiments of the present invention.

In the first and second exemplary embodiments, detected is either a failure caused by the more significant factor 500 of time variation statistically independent of occurrence time in a communication area in which the number of occurrences of an alarm is to be monitored or a failure caused by the factor 504 of space variation statistically independent of an occurrence place in an area formed of a peripheral communication area geographically adjacent to the communication area to be monitored.

On the other hand, the present exemplary embodiment detects both a failure caused by the more significant factor 500 of time variation and a failure caused by the more significant factor 504 of space variation (more significant factor of time and space variation).

In particular, in the present exemplary embodiment, the more significant factor 500 is the same as the more significant factor 500 of time variation in the first exemplary embodiment and the more significant factor 504 is the same as the more significant factor 504 of space variation in the second exemplary embodiment.

In the following, description will be mainly made of differences from the above-described first and second exemplary embodiments and description of the common components to those of the first and second exemplary embodiments will be appropriately omitted.

Structure of the Third Exemplary Embodiment

Figure 18:
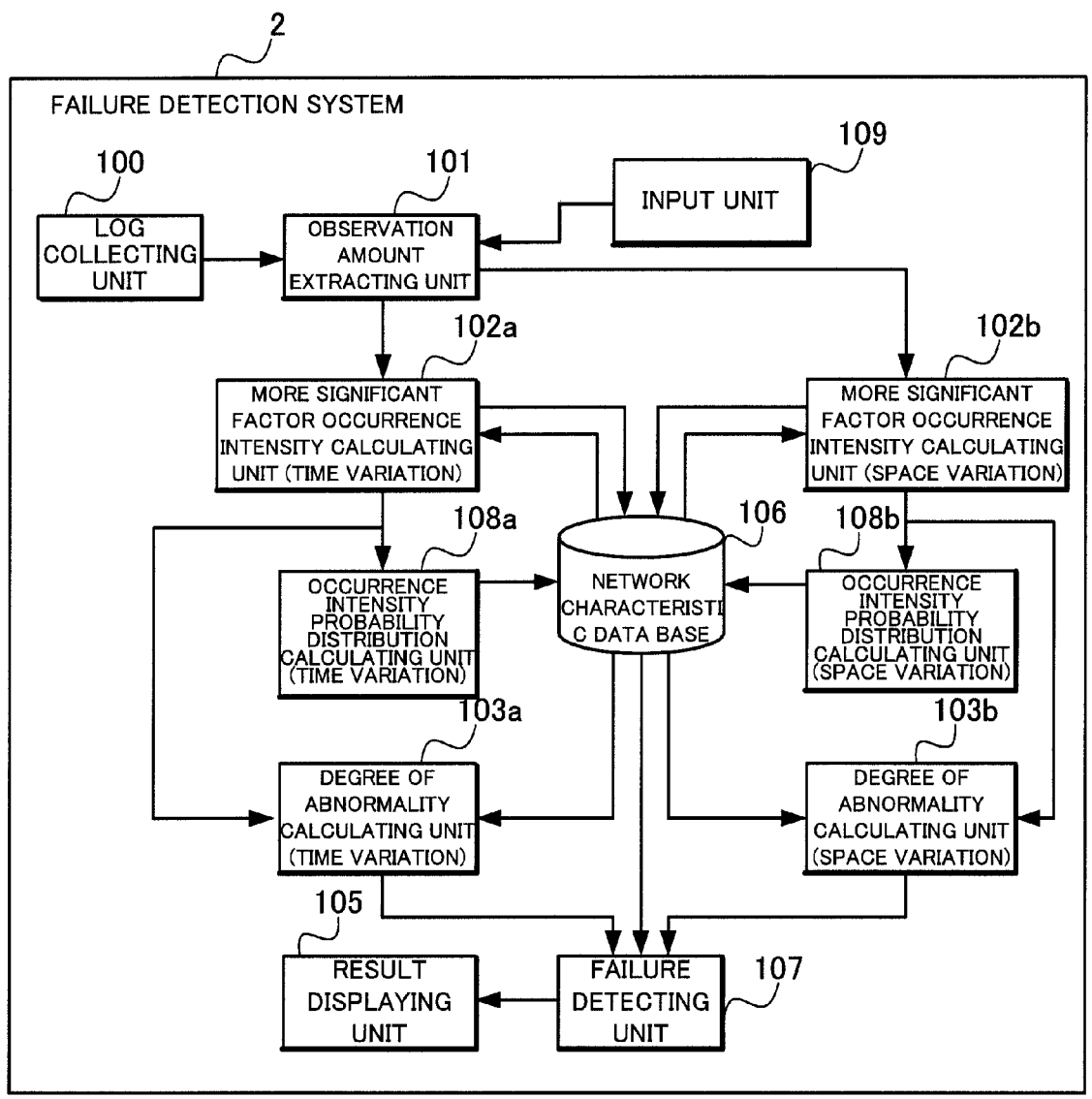
FIG. 18 is a structural diagram of a communication network failure detection system 1 according to the third exemplary embodiment of the present invention.

FIG. 18 is a structural diagram of a failure detection system 1 of a communication network according to the third exemplary embodiment of the present invention.

Structure of the failure detection system 1 of the communication network according to the present exemplary embodiment differs from the structures of the failure detection systems 1 of the communication network according to the first and second exemplary embodiments in that the more significant factor occurrence intensity calculating unit 102 in the first and second exemplary embodiments for converting an observation amount into an occurrence intensity of its more significant factor is formed separately as a more significant factor occurrence intensity calculating unit 102a for converting an observation amount into an occurrence intensity of the more significant factor 500 of time variation and a more significant factor occurrence intensity calculating unit 102b for converting an observation amount into an occurrence intensity of the more significant factor 504 of space variation, that the occurrence intensity probability distribution calculating unit 108 for calculating a probability distribution of an occurrence intensity of a more significant factor at the normal state and storing the same in the network characteristic data base 106 is formed separately as an occurrence intensity probability distribution calculating unit 108a for the more significant factor 500 of time variation and an occurrence intensity probability distribution calculating unit 108b for the more significant factor 504 of space variation, that the degree of abnormality calculating unit 103 is separately formed as a degree of abnormality calculating unit 103a for calculating a degree of abnormality of a communication network from the degree of abnormality of occurrence intensity of the more significant factor 500 of time variation and a degree of abnormality calculating unit 103b for calculating a degree of abnormality of a communication network from the degree of abnormality of occurrence intensity of the more significant factor 504 of space variation, and that the failure detecting unit 104 is replaced by a failure detecting unit 107 for detecting a failure by executing failure determination based on a degree of abnormality of the above-described two kinds of communication networks calculated by the degree of abnormality calculating units 103a and 103b.

Figure 19:
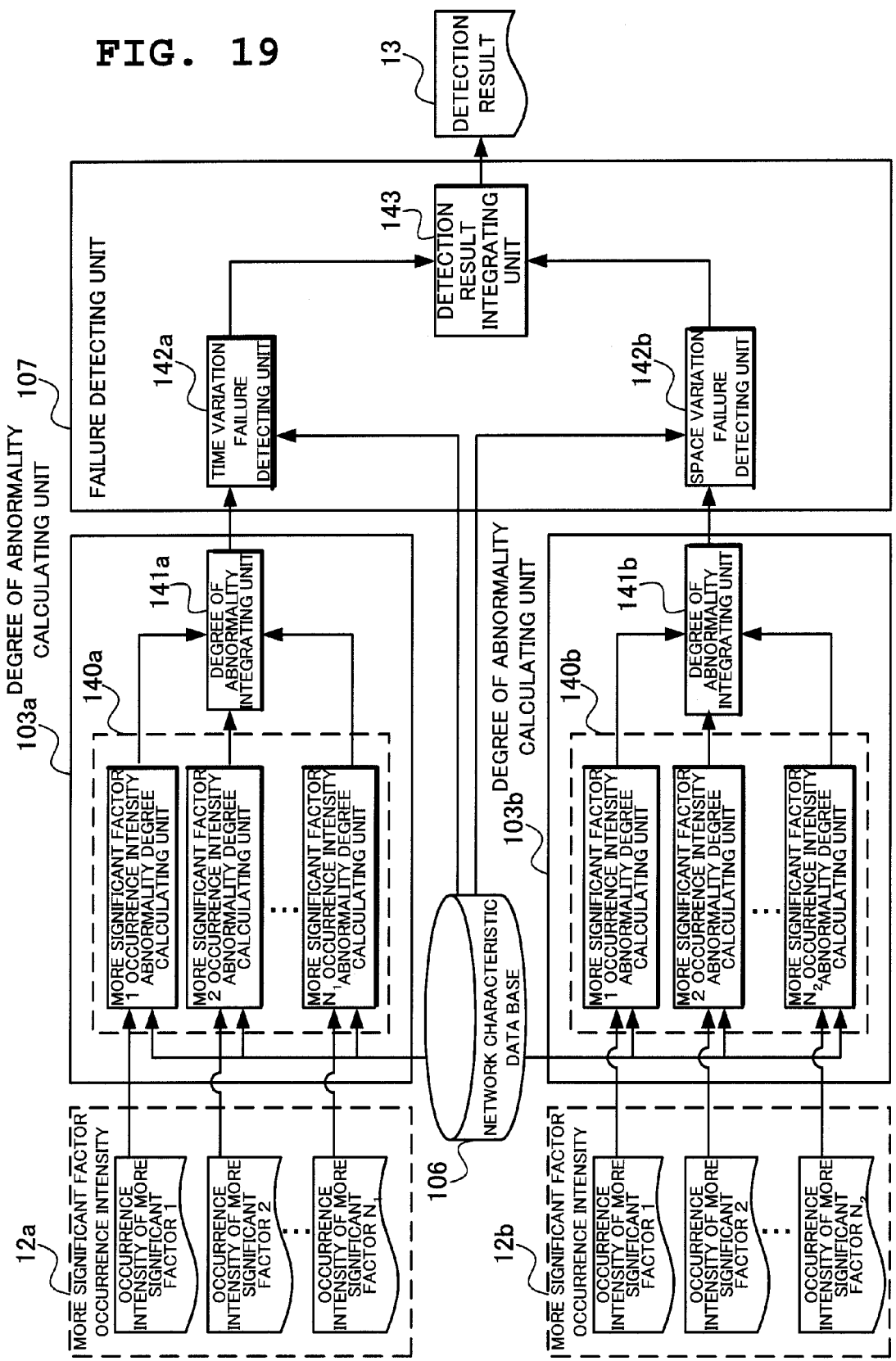
FIG. 19 is a structural diagram of degree of abnormality calculating units 103a and 103b and a failure detecting unit 107 according to the third exemplary embodiment of the present invention.

FIG. 19 is a structural diagram of the degree of abnormality calculating units 103a and 103b and the failure detecting unit 107 according to the present exemplary embodiment.

Of the occurrence intensities of more significant factors of an alarm, a more significant factor occurrence intensity 12a of the more significant factor 500 of time variation and a more significant factor occurrence intensity 12b of the more significant factor 504 of space variation are in parallel applied to the degree of abnormality calculating units 103a and 103b of the occurrence intensity, respectively, and these degrees of abnormality are calculated by occurrence intensity abnormality degree calculating units 140a and 140b and integrated by degree of abnormality integrating units 141a and 141b.

The integrated degrees of abnormality are applied to a time variation failure detecting unit 142a and a space variation failure detecting unit 142b to output results of failure detection by the processing of comparison with a threshold value stored in the network characteristic data base 106, which results are integrated by a detection result integrating unit 143 and output as the ultimate detection result 13 to the result displaying unit 105.

Figure 20:
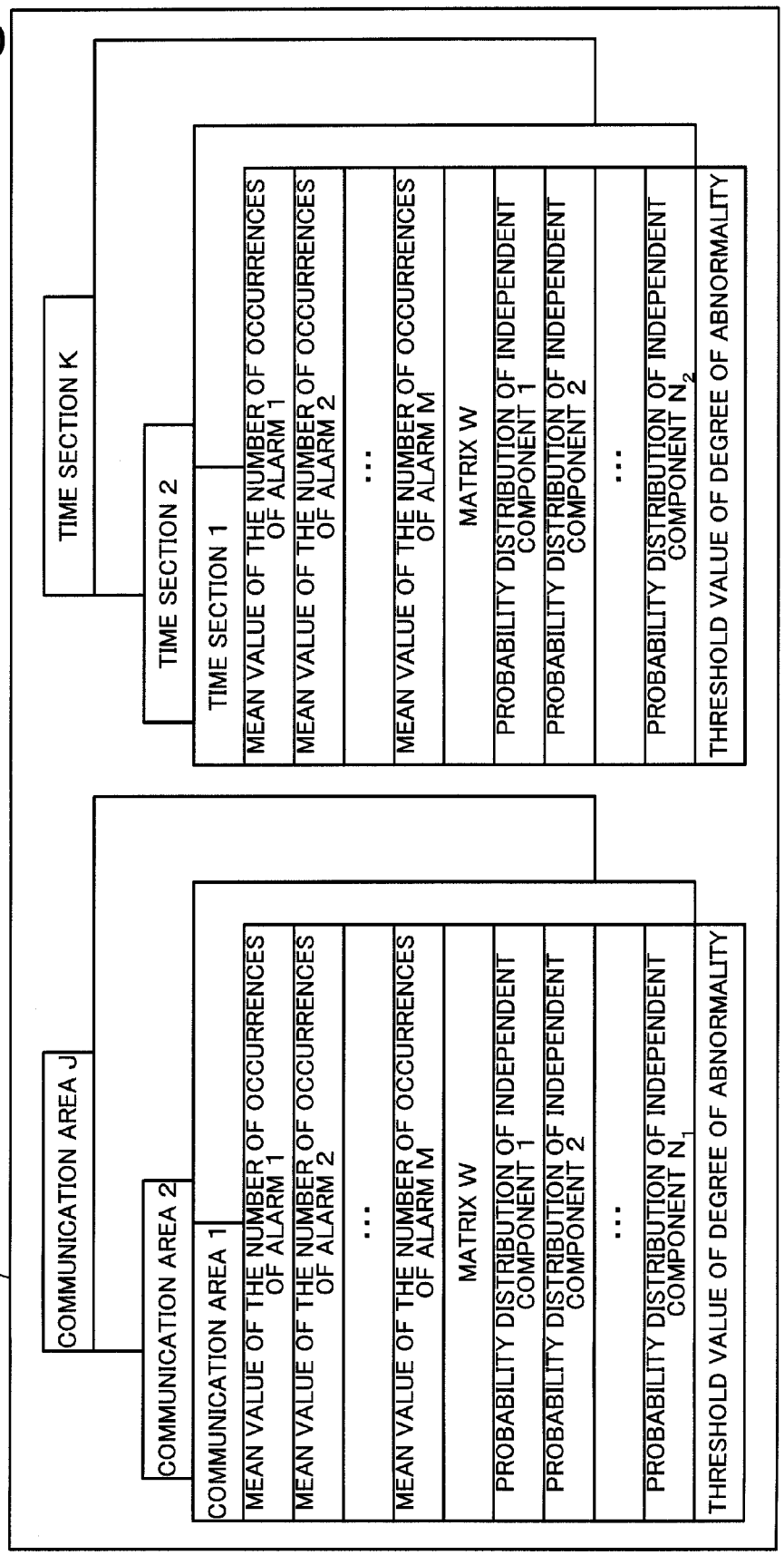
FIG. 20 is a structural diagram of information of the network characteristic data base 106 according to the third exemplary embodiment of the present invention.

FIG. 20 is a structural diagram of information stored in the network characteristic data base 106 in the present exemplary embodiment.

The network characteristic data base 106 in the present exemplary embodiment includes both information stored in the network characteristic data bases 106 in the first and second exemplary embodiments.

In set-up processing of the network characteristic data base 106 in the present exemplary embodiment, the set-up processing of the network characteristic data base 106 according to the first and second exemplary embodiments are individually applied to generate information to be stored in the network characteristic data base 106.

Operation of the Third Exemplary Embodiment

FIG. 21 is a diagram for use in explaining operation of the failure detection system 1 according to the present exemplary embodiment.

The failure detection systems 1 according to the first and second exemplary embodiments, after extracting an observation amount of designated communication area and time and space (Step S803, S1503), resolve the observation amount into an independent component of time variation (Step S804) or resolve the observation amount into an independent component of space variation (Step S1504). Difference between the failure detection system 1 in the present exemplary embodiment from the failure detection systems 1 in the first and second exemplary embodiments resides in that after extracting observation amounts of designated communication area and time and space (Step S2103), the failure detection system 1 according to the present exemplary embodiment resolves the observation amount into an independent component of space variation at Step S2104b in parallel to resolution of the observation amount into an independent component of time variation at Step S2104a and executes processing of calculating a degree of abnormality with respect to each of time and space variation components in parallel at Step S2105a and Step S2105b, processing of integrating degrees of abnormality at Step S2106a and Step S2106b and failure detection processing at Step S2107a and Step S2107b to integrate failure detection results of time and space at Step S2108.

In the integration at Step S841, failure detection is notified when a failure is detected either at Step S807a or Step S807b.

Since other operation of the failure detection system 1 in the present exemplary embodiment is the same as the corresponding operation of the above-described failure detection systems 1 according to the first and second exemplary embodiments, a method of selectively using a matrix W or a probability distribution is also the same as the corresponding methods in the first and second exemplary embodiments.

Effects of the Third Exemplary Embodiment

Next, effects of the present exemplary embodiment will be described.

Since the present exemplary embodiment detects a failure by simultaneously monitoring both a time variation in the number of alarms in a communication area to be monitored and a space variation in the number of alarms in a time section to be monitored, both failures can be detected, a failure with which the number of alarms indicates an abnormal time variation as compared with that in a predetermined time section at the normal state within the same communication area and a failure with which the number of alarms indicates an abnormal space variation as compared with a predetermined communication area at the normal state within the same time section (see FIG. 17).

First Specific Example

Next, a specific example 1 of the failure detection system according to the present invention will be described. Such specific example 1 corresponds to the first and third exemplary embodiments of the present invention.

In the present specific example, at the matrix W calculating unit 130, a value of the matrix W is obtained by using a mutual moment as an index of independency and the slope method as a learning algorithm.

Quaternary mutual moment $E[Y_i^3 Y_j]$ for probability variables $Y_i$ and $Y_j$ of elements $y_i(t)$ and $y_j(t)$ of the signal vector y(t) can be resolved into a product of their moments as shown by a mathematical expression (7) when the probability variables Yi and Yj are independent, and the quaternary mutual moment will be zero when either $E[Y_i^3]$ or $E[Y_j]$ is zero.

Under these circumstances, for example, when an evaluation function $\phi(W)$ as shown in a mathematical expression (8) is provided by subtracting a sample average in advance from the observation signal vector x(t) to operate such that $E[Y_j]$ is zero, it can be found that a matrix W which minimizes the mathematical expression (8) returns a signal vector y(t) whose independency is the highest.

$$E[Y_i^3 Y_j] = E[Y_i^3]E[Y_j] = 0 \qquad \text{expression (7)}$$

$$\varphi(W) = \sum_{i \neq j} \left| E[Y_i^3 Y_j] \right| \qquad \text{expression (8)}$$

Thus obtained matrix W can be obtained by updating the matrix w by using an appropriate positive constant $\epsilon$ according to a mathematical expression (9). The amount dW of update of the matrix is given by a mathematical expression (10) and a differentiation $\nabla \phi(W)$ of the evaluation function $\phi(W)$ is given by a mathematical expression (11).

$(\partial \phi(W)/\partial w_{ij})$ represents a matrix having differentiation by each component $w_{ij}$ of the matrix W aligned as a (i,j) component. The quaternary mutual moment is calculated according to a mathematical expression (12) by using a sample of the signal vector y(t) at time $t=t_1, t_2, \ldots t_n$.

$$W \leftarrow W + \varepsilon dW \qquad \text{expression (9)}$$

$$dW = -\nabla \varphi(W) W^T W \qquad \text{expression (10)}$$

$$\nabla \varphi(W) = \frac{d\varphi(W)}{dW} = \left(\frac{\partial \varphi(W)}{\partial w_{ij}}\right) \qquad \text{expression (11)}$$

$$E[Y_i^3 Y_j] \cong \frac{1}{n} \sum_{k=1}^{n} y_i^3(t_k) y_j(t_k) \qquad \text{expression (12)}$$

Second Specific Example

Next, a specific example 2 of the failure detection system according to the present invention will be described. The specific example 2 corresponds to the second and third exemplary embodiments of the present invention.

Although the present specific example differs in calculating a quaternary mutual moment according to a mathematical expression (13) by using a sample of the signal vector y(s) at a position $s=s_1, s_2, \ldots, s_n$ from the specific example 1 in which a quaternary mutual moment is calculated according to the mathematical expression (12) by using a sample of the signal vector y(s) at a time $t=t_1, t_2, \ldots, t_n$, the remaining parts are the same as those of the above-described specific example 1.

$$E[Y_i^3 Y_j] \cong \frac{1}{n} \sum_{K=1}^{n} y_i^3(s_k) y_j(s_k) \qquad \text{expression (13)}$$

Although the present invention has been described in the foregoing with respect to a plurality of preferred exemplary embodiments and specific examples, the present invention is not necessarily limited to the above-described exemplary embodiments and specific examples and can be implemented in various form within the range of its technical idea.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-202134, filed on Jul. 11, 2005, the disclosure of which is incorporated herein in its entirety by reference.

INDUSTRIAL APPLICABILITY

The present invention is applicable to a failure detection system for detecting a failure of an object to be managed by a management system in general which outputs an alarm log in which alarms are recited in time series.

The invention claimed is:

1. In a communication network for which contents of an alarm issued at the time of a failure of communication are recorded, a communication network failure detection system, comprising:

an occurrence intensity calculating unit for a more significant factor for calculating an occurrence intensity of said more significant factor causing an alarm by analyzing the recording contents of the alarm;

an occurrence intensity probability distribution calculating unit for calculating a probability distribution of an occurrence intensity of said more significant factor in said communication network at a normal state;

a degree of abnormality calculating unit for calculating, with respect to a calculated occurrence intensity of said more significant factor, a degree of probability deviation from an occurrence intensity probability distribution of said more significant factor at said normal state as a degree of abnormality; and a failure detecting unit for detecting a failure derived from said more significant factor in said communication network by comparing said degree of abnormality and a threshold value applied in advance.

2. The communication network failure detection system according to claim 1, wherein said occurrence intensity calculating unit for said more significant factor includes a time variation parameter extracting unit for extracting a parameter indicative of a time variation in an alarm occurrence frequency from the recording contents of said alarm to consider a value of said parameter indicative of a time variation as an occurrence intensity of said more significant factor.

3. The communication network failure detection system according to claim 1, wherein said occurrence intensity probability distribution calculating unit calculates a probability distribution of an occurrence intensity of said more significant factor in said communication network at the normal state based on an estimation result obtained by the occurrence intensity calculating unit for the more significant factor during a past period when a communication device having issued the alarm operated normally.

4. The communication network failure detection system according to claim 1, wherein said occurrence intensity calculating unit for the more significant factor includes a space variation parameter extracting unit for extracting a parameter indicative of a space variation in an alarm occurrence frequency from the recording contents of said alarm to consider a value of said parameter indicative of a space variation as an occurrence intensity of said more significant factor.

5. The communication network failure detection system according to claim 1, wherein said occurrence intensity probability distribution calculating unit calculates a probability distribution of an occurrence intensity of said more significant factor in the communication network at the normal state based on an estimation result obtained by the occurrence intensity calculating unit for the more significant factor in other communication device geographically adjacent to a communication device having issued the alarm.

6. A communication network failure detection system, comprising:

an occurrence intensity calculating unit for a more significant factor for calculating an occurrence intensity of a more significant factor causing an alarm by analyzing the recording contents of said alarm;

an occurrence intensity probability distribution calculating unit for calculating a probability distribution of an occurrence intensity of said more significant factor in a communication network at a normal state;

a degree of abnormality calculating unit for calculating, with respect to a calculated occurrence intensity of said more significant factor, a degree of probability deviation from an occurrence intensity probability distribution of said more significant factor at the normal state as a degree of abnormality; and a failure detecting unit for detecting a failure of the communication network by comparing said degree of abnormality and a threshold value applied in advance, wherein said occurrence intensity calculating unit for the more significant factor includes a time variation parameter extracting unit for extracting a parameter indicative of a time variation in an alarm occurrence frequency from the recording contents of said alarm, and a space variation parameter extracting unit for extracting a parameter indicative of a space variation in an alarm occurrence frequency to consider values of said parameter indicative of a time variation and said parameter indicative of a space variation as an occurrence intensity of said more significant factor.

7. The communication network failure detection system according to claim 6, wherein said occurrence intensity probability distribution calculating unit calculates a probability distribution of an occurrence intensity of said more significant factor in the communication network at the normal state based on an estimation result obtained by said occurrence intensity calculating unit for the more significant factor during a past period when a communication device having issued the alarm operated normally and an estimation result obtained by said occurrence intensity calculating unit for the more significant factor in other communication device geographically adjacent to the communication device having issued the alarm.

8. The communication network failure detection system according to claim 6, wherein said time variation parameter extracting unit and said space variation parameter extracting unit obtain statistically independent time variation component and space variation component from an alarm occurrence frequency by using an independent component analysis method to consider the components as the parameter indicative of a time variation and the parameter indicative of a space variation, respectively.

9. The communication network failure detection system according to claim 6, wherein with an upper side probability or a lower side probability or a both-side probability of the occurrence intensity probability distribution as a degree of abnormality, individually with respect to an occurrence intensity of said more significant factor obtained from said parameter indicative of a time variation and an occurrence intensity of said more significant factor obtained from said parameter indicative of a space variation, said degree of abnormality calculating unit multiplies occurrence intensities of a plurality of more significant factors by the respective degrees of abnormality obtained to consider a result as a degree of abnormality as a whole.

10. The communication network failure detection system according to claim 6, wherein said failure detecting unit detects a failure by using both said degree of abnormality obtained from said parameter indicative of a time variation and said degree of abnormality obtained from said parameter indicative of a space variation.

11. In a communication network for which contents of an alarm issued at the time of a failure of communication are recorded, a communication network failure detecting method, comprising the steps of:

a occurrence intensity calculating step for a more significant factor of calculating an occurrence intensity of said more significant factor causing an alarm by analyzing the recording contents of the alarm;

a occurrence intensity probability distribution calculating step of calculating a probability distribution of an occurrence intensity of said more significant factor in said communication network at a normal state;

a degree of abnormality calculating step of calculating, with respect to a calculated occurrence intensity of said more significant factor, a degree of probability deviation from an occurrence intensity probability distribution of said more significant factor at said normal state as a degree of abnormality; and a failure detecting step of detecting a failure derived from said more significant factor in said communication network by comparing said degree of abnormality and a threshold value applied in advance.

12. The communication network failure detecting method according to claim 11, wherein said occurrence intensity calculating step for said more significant factor includes a time variation parameter extracting step of extracting a parameter indicative of a time variation in an alarm occurrence frequency from the recording contents of said alarm to consider a value of said parameter indicative of a time variation as an occurrence intensity of said more significant factor.

13. The communication network failure detecting method according to claim 11, wherein at said occurrence intensity probability distribution calculating step, a probability distribution of an occurrence intensity of said more significant factor in said communication network at the normal state is calculated based on an estimation result obtained by the occurrence intensity calculating step for the more significant factor during a past period when a communication device having issued the alarm operated normally.

14. The communication network failure detecting method according to claim 11, wherein said occurrence intensity calculating step for the more significant factor includes a space variation parameter extracting step of extracting a parameter indicative of a space variation in an alarm occurrence frequency from the recording contents of said alarm to consider a value of said parameter indicative of a space variation as an occurrence intensity of said more significant factor.

15. The communication network failure detecting method according to claim 11, wherein at said occurrence intensity probability distribution calculating step, a probability distribution of an occurrence intensity of said more significant factor in the communication network at the normal state is calculated based on an estimation result obtained by the occurrence intensity calculating step for the more significant factor in other communication device geographically adjacent to a communication device having issued the alarm.

16. A communication network failure detecting method, comprising the steps of:

a occurrence intensity calculating step for a more significant factor of calculating an occurrence intensity of said more significant factor causing an alarm by analyzing the recording contents of said alarm;

a occurrence intensity probability distribution calculating step of calculating a probability distribution of an occurrence intensity of said more significant factor in a communication network at a normal state;

a degree of abnormality calculating step of calculating, with respect to a calculated occurrence intensity of said more significant factor, a degree of probability deviation from an occurrence intensity probability distribution of said more significant factor at the normal state as a degree of abnormality; and a failure detecting step of detecting a failure of the communication network by comparing said degree of abnormality and a threshold value applied in advance, wherein said occurrence intensity calculating step for the more significant factor includes a time variation parameter extracting step of extracting a parameter indicative of a time variation in an alarm occurrence frequency from the recording contents of said alarm and the space variation parameter extracting step of extracting a parameter indicative of a space variation in an alarm occurrence frequency, and considers values of said parameter indicative of a time variation and said parameter indicative of a space variation as an occurrence intensity of said more significant factor.

17. The communication network failure detecting method according to claim 16, wherein at said occurrence intensity probability distribution calculating step, a probability distribution of an occurrence intensity of said more significant factor in the communication network at the normal state is calculated based on an estimation result obtained by said occurrence intensity calculating step for the more significant factor during a past period when a communication device having issued the alarm operated normally and an estimation result obtained by said occurrence intensity calculating step for the more significant factor in other communication device geographically adjacent to the communication device having issued the alarm.

18. The communication network failure detecting method according to claim 16, wherein at said time variation parameter extracting step and said space variation parameter extracting step, statistically independent time variation component and space variation component are obtained from an alarm occurrence frequency by using an independent component analysis method to consider the components as the parameter indicative of a time variation and the parameter indicative of a space variation, respectively.

19. The communication network failure detecting method according to claim 16, wherein at said degree of abnormality calculating step, with an upper side probability or a lower side probability or a both-side probability of the occurrence intensity probability distribution as a degree of abnormality, individually with respect to an occurrence intensity of said more significant factor obtained from said parameter indicative of a time variation and an occurrence intensity of said more significant factor obtained from said parameter indicative of a space variation, occurrence intensities of a plurality of more significant factors are multiplied by the respective degrees of abnormality obtained to consider a result as a degree of abnormality as a whole.

20. The communication network failure detecting method according to claim 16, wherein at said failure detecting step, a failure is detected by using both said degree of abnormality obtained from said parameter indicative of a time variation and said degree of abnormality obtained from said parameter indicative of a space variation.

21. A non transitory computer-readable storage medium storing a failure detection program operable in a communication device on a communication network for which contents of an alarm issued at the time of a failure of communication are recorded, the failure detection program causing said communication device to execute the functions of:

a occurrence intensity calculating function for a more significant factor of calculating an occurrence intensity of said more significant factor causing an alarm by analyzing the recording contents of the alarm;

a occurrence intensity probability distribution calculating function of calculating a probability distribution of an occurrence intensity of said more significant factor in said communication network at a normal state;

a degree of abnormality calculating function of calculating, with respect to a calculated occurrence intensity of said more significant factor, a degree of probability deviation from an occurrence intensity probability distribution of said more significant factor at said normal state as a degree of abnormality; and a failure detecting function of detecting a failure derived from said more significant factor in said communication network by comparing said degree of abnormality and a threshold value applied in advance.

22. The non-transitory computer-readable storage medium according to claim 21, wherein said function of calculating an occurrence intensity of said more significant factor includes the time variation parameter extracting function of extracting a parameter indicative of a time variation in an alarm occurrence frequency from the recording contents of said alarm to consider a value of said parameter indicative of a time variation as an occurrence intensity of said more significant factor.

23. The non-transitory computer-readable storage medium according to claim 21, wherein as said occurrence intensity probability distribution calculating function, a probability distribution of an occurrence intensity of said more significant factor in said communication network at the normal state is calculated based on an estimation result obtained by the occurrence intensity calculating function for the more significant factor during a past period when a communication device having issued the alarm operated normally.

24. The non-transitory computer-readable storage medium according to claim 21, wherein said function of calculating an occurrence intensity of the more significant factor includes the space variation parameter extracting function of extracting a parameter indicative of a space variation in an alarm occurrence frequency from the recording contents of said alarm to consider a value of said parameter indicative of a space variation as an occurrence intensity of said more significant factor.

25. The non-transitory computer-readable storage medium according to claim 21, wherein as said occurrence intensity probability distribution calculating function, a probability distribution of an occurrence intensity of said more significant factor in the communication network at the normal state is calculated based on an estimation result obtained by the occurrence intensity calculating function for the more significant factor in other communication device geographically adjacent to a communication device having issued the alarm.

26. A non-transitory computer-readable storage medium storing a failure detection program, the failure detection program causing a communication device on a communication network to execute the functions of:

a occurrence intensity calculating function for a more significant factor of calculating an occurrence intensity of a more significant factor causing an alarm by analyzing the recording contents of the alarm;

a occurrence intensity probability distribution calculating function of calculating a probability distribution of an occurrence intensity of said more significant factor in the communication network at a normal state;

a degree of abnormality calculating function of calculating, with respect to a calculated occurrence intensity of said more significant factor, a degree of probability deviation from an occurrence intensity probability distribution of said more significant factor at the normal state as a degree of abnormality; and a failure detecting function of detecting a failure of the communication network by comparing said degree of abnormality and a threshold value applied in advance, wherein said occurrence intensity calculating function for said more significant factor includes the time variation parameter extracting function of extracting a parameter indicative of a time variation in an alarm occurrence frequency from the recording contents of said alarm, and the space variation parameter extracting function of extracting a parameter indicative of a space variation in an alarm occurrence frequency, and considers values of said parameter indicative of a time variation and said parameter indicative of a space variation as an occurrence intensity of said more significant factor.

27. The non-transitory computer-readable storage medium according to claim 26, wherein in said occurrence intensity probability distribution calculating function, a probability distribution of an occurrence intensity of said more significant factor in the communication network at the normal state is calculated based on an estimation result obtained by said occurrence intensity calculating function for the more significant factor during a past period when a communication device having issued the alarm operated normally and an estimation result obtained by said occurrence intensity calculating function for the more significant factor in other communication device geographically adjacent to the communication device having issued the alarm.

28. The non-transitory computer-readable storage medium according to claim 26, wherein in said time variation parameter extracting function and said space variation parameter extracting function, statistically independent time variation component and space variation component are obtained from an alarm occurrence frequency by using an independent component analysis method to consider the components as the parameter indicative of a time variation and the parameter indicative of a space variation, respectively.

29. The non-transitory computer-readable storage medium according to claim 26, wherein in said degree of abnormality calculating function, with an upper side probability or a lower side probability or a both-side probability of the occurrence intensity probability distribution as a degree of abnormality, individually with respect to an occurrence intensity of said more significant factor obtained from said parameter indicative of a time variation and an occurrence intensity of said more significant factor obtained from said parameter indicative of a space variation, occurrence intensities of a plurality of more significant factors are multiplied by the respective degrees of abnormality obtained to consider a result as a degree of abnormality as a whole.

30. The non-transitory computer-readable storage medium according to claim 26, wherein in said failure detecting function, a failure is detected by using both said degree of abnormality obtained from said parameter indicative of a time variation and said degree of abnormality obtained from said parameter indicative of a space variation.

* * * * *